United States Patent
Bryson et al.

(10) Patent No.: US 7,447,320 B2
(45) Date of Patent: *Nov. 4, 2008

(54) VEHICLE ACCESSORY MICROPHONE

(75) Inventors: Michael A. Bryson, Hudsonville, MI (US); Alan R. Watson, Buchanan, MI (US)

(73) Assignee: Gentex Corporation, Zeeland, MI (US)

( * ) Notice: Subject to any disclaimer, the term of this patent is extended or adjusted under 35 U.S.C. 154(b) by 533 days.

This patent is subject to a terminal disclaimer.

(21) Appl. No.: 10/492,490

(22) Filed: Apr. 9, 2004

(65) Prior Publication Data

US 2004/0208334 A1 Oct. 21, 2004

Related U.S. Application Data

(63) Continuation-in-part of application No. 10/076,158, filed on Feb. 14, 2002.

(60) Provisional application No. 60/328,538, filed on Oct. 11, 2001, provisional application No. 60/314,252, filed on Aug. 22, 2001, provisional application No. 60/285,811, filed on Apr. 23, 2001, provisional application No. 60/268,609, filed on Feb. 14, 2001.

(51) Int. Cl.
*H04B 1/00* (2006.01)
(52) U.S. Cl. .............................. 381/86; 381/92; 381/359
(58) Field of Classification Search .................. 381/86, 381/91, 361, 365, 122, 351, 350, 359–360, 381/389, 381, 355–356, 111, 92
See application file for complete search history.

(56) References Cited

U.S. PATENT DOCUMENTS 2,921,993 A 1/1960 Beaverson (Continued)

FOREIGN PATENT DOCUMENTS

DE 104 891 A1 3/1974

(Continued)

OTHER PUBLICATIONS

JP Patent Abstract 07250144 A, Sep. 26, 1995.

(Continued)

*Primary Examiner*—Vivian Chin
*Assistant Examiner*—Lun-See Lao
(74) *Attorney, Agent, or Firm*—Price Heneveld Cooper DeWitt & Litton LLP

(57) ABSTRACT

A vehicle rearview mirror assembly (201) includes one or more microphone assemblies (220a, 220b) positioned on the rear surface (207) of the mirror housing (206). Recesses (248a, 248b) are provided in the rear surface to serve as a deflector for deflecting airflow from the defroster. Front ports (216) are provided on the microphone housing (215) that open upward, while rear ports (218) open downward. The microphone assemblies may include an acoustic dam (230) that extends around the microphone transducer (225) to acoustically separate the acoustic chamber within the microphone housing into two zones such that the front face of the transducer is acoustically coupled to the first zone and the rear face of transducer is acoustically coupled to the second zone. The microphone assemblies may include windscreens (245) made of a material of high acoustic resistivity (i.e., about 1 or more $\Omega/cm^2$), and preferably of very high acoustic resistivity (i.e., about 8 or more $\Omega/cm^2$).

18 Claims, 22 Drawing Sheets

U.S. PATENT DOCUMENTS

| | | | |
|---|---|---|---|
| 3,777,079 A | 12/1973 | Fischer et al. | |
| 3,963,881 A | 6/1976 | Fraim et al. | |
| 3,995,124 A * | 11/1976 | Gabr | 381/357 |
| 4,117,275 A | 9/1978 | Miyanaga et al. | |
| 4,182,937 A | 1/1980 | Greenwood | |
| 4,194,096 A | 3/1980 | Ramsey | |
| 4,258,235 A | 3/1981 | Watson | |
| 4,264,790 A | 4/1981 | Zlevor | |
| 4,268,725 A | 5/1981 | Nakagawa et al. | |
| 4,354,059 A | 10/1982 | Ishigaki et al. | |
| 4,362,907 A | 12/1982 | Polacsek | |
| 4,401,859 A | 8/1983 | Watson | |
| 4,410,770 A | 10/1983 | Hagey | |
| 4,418,404 A | 11/1983 | Gordon et al. | |
| 4,456,796 A | 6/1984 | Nakagawa et al. | |
| 4,567,608 A | 1/1986 | Watson et al. | |
| 4,570,746 A | 2/1986 | Das et al. | |
| 4,600,077 A | 7/1986 | Drever | |
| 4,625,827 A | 12/1986 | Bartlett | |
| 4,658,425 A | 4/1987 | Julstrom | |
| 4,672,674 A | 6/1987 | Clough et al. | |
| 4,685,137 A | 8/1987 | Watson et al. | |
| 4,712,429 A | 12/1987 | Raspet et al. | |
| 4,737,976 A | 4/1988 | Borth et al. | |
| 4,768,614 A | 9/1988 | Case | |
| 4,817,164 A | 3/1989 | Bertignoll et al. | |
| 4,858,719 A | 8/1989 | Fidi et al. | |
| 4,885,773 A | 12/1989 | Stottlemyer et al. | |
| 4,887,300 A | 12/1989 | Erling | |
| 4,888,807 A | 12/1989 | Reichel | |
| 4,930,742 A | 6/1990 | Schofield et al. | |
| 4,975,966 A | 12/1990 | Sapiejewski | |
| 5,185,803 A | 2/1993 | Moyski et al. | |
| 5,193,117 A | 3/1993 | Ono et al. | |
| 5,212,764 A | 5/1993 | Ariyoshi | |
| 5,226,087 A | 7/1993 | Ono et al. | |
| 5,268,965 A | 12/1993 | Badie et al. | |
| 5,323,466 A | 6/1994 | Geddes | |
| 5,335,282 A | 8/1994 | Cardas | |
| 5,349,140 A | 9/1994 | Valenzin | |
| 5,353,376 A | 10/1994 | Oh et al. | |
| 5,365,595 A | 11/1994 | Li | |
| 5,410,604 A | 4/1995 | Saito et al. | |
| 5,414,776 A | 5/1995 | Sims, Jr. | |
| 5,426,703 A | 6/1995 | Hamabe et al. | |
| 5,442,813 A | 8/1995 | Walters | |
| 5,459,702 A | 10/1995 | Greenspan | |
| 5,473,684 A | 12/1995 | Bartlett et al. | |
| 5,546,458 A | 8/1996 | Iwami | |
| 5,566,224 A | 10/1996 | ul Azam et al. | |
| 5,568,559 A | 10/1996 | Makino | |
| 5,631,638 A | 5/1997 | Kaspar et al. | |
| 5,673,325 A | 9/1997 | Andrea et al. | |
| 5,699,436 A | 12/1997 | Claybaugh et al. | |
| 5,703,957 A | 12/1997 | McAteer | |
| 5,732,143 A | 3/1998 | Andrea et al. | |
| 5,754,665 A | 5/1998 | Hosoi | |
| 5,796,819 A | 8/1998 | Romesburg | |
| 5,812,496 A | 9/1998 | Peck | |
| 5,825,897 A | 10/1998 | Andrea et al. | |
| 5,835,607 A | 11/1998 | Martin et al. | |
| 5,835,608 A | 11/1998 | Warnaka et al. | |
| 5,854,848 A | 12/1998 | Tate et al. | |
| 5,862,240 A | 1/1999 | Ohkubo et al. | |
| 5,870,485 A | 2/1999 | Lundgren et al. | |
| 5,878,353 A | 3/1999 | ul Azam et al. | |
| 5,917,921 A | 6/1999 | Sasaki et al. | |
| 5,940,503 A | 8/1999 | Palett et al. | |
| 5,969,838 A | 10/1999 | Paritsky et al. | |
| 6,026,162 A | 2/2000 | Palett et al. | |
| 6,028,537 A | 2/2000 | Suman et al. | |
| 6,061,457 A | 5/2000 | Stockhamer | |
| 6,089,721 A | 7/2000 | Schierbeek | |
| 6,091,830 A | 7/2000 | Toki | |
| 6,108,415 A | 8/2000 | Andrea | |
| 6,118,881 A | 9/2000 | Quinlan et al. | |
| 6,127,919 A | 10/2000 | Wylin | |
| 6,154,554 A | 11/2000 | Kondo | |
| 6,243,003 B1 | 6/2001 | DeLine et al. | |
| 6,246,765 B1 | 6/2001 | Palett et al. | |
| 6,275,580 B1 | 8/2001 | Faraci et al. | |
| 6,278,377 B1 | 8/2001 | DeLine et al. | |
| 6,356,641 B1 | 3/2002 | Warnaka et al. | |
| 6,389,142 B1 | 5/2002 | Hagen et al. | |
| 6,420,975 B1 | 7/2002 | DeLine et al. | |
| 6,433,676 B2 | 8/2002 | DeLine et al. | |
| 6,466,136 B2 | 10/2002 | DeLine et al. | |
| 6,505,087 B1 | 1/2003 | Lucas et al. | |
| 6,654,468 B1 | 11/2003 | Thompson | |
| 6,980,089 B1 * | 12/2005 | Kline | 340/425.5 |
| 7,110,558 B1 * | 9/2006 | Elliott | 381/105 |

FOREIGN PATENT DOCUMENTS

| | | |
|---|---|---|
| EP | 0411360 B1 | 2/1991 |
| EP | 0543087 A2 | 8/1992 |
| EP | 0624046 B1 | 11/1994 |
| EP | 1078818 | 11/1994 |
| EP | 0846598 A2 | 6/1998 |
| EP | 0 624 046 A1 | 11/2004 |
| GB | 2327012 A | 1/1999 |
| JP | 55073195 | 6/1980 |
| JP | 56-89194 A | 7/1981 |
| JP | 56-116396 | 9/1981 |
| JP | 58027496 | 2/1983 |
| JP | 59-149494 A | 8/1984 |
| JP | 62-281596 | 12/1987 |
| JP | 62-281597 | 12/1987 |
| JP | 03231044 A | 10/1991 |
| JP | 5-207117 | 8/1993 |
| JP | 7-39152 | 7/1995 |
| JP | 10-107880 | 4/1998 |
| JP | 2001352595 A | 12/2001 |
| WO | WO 96/25019 | 8/1996 |
| WO | WO 98/58450 A1 | 12/1998 |
| WO | WO 99/37122 | 7/1999 |
| WO | WO 99/66638 A1 | 12/1999 |
| WO | WO 99/66647 A1 | 12/1999 |
| WO | WO 00/52639 A2 | 9/2000 |
| WO | WO 2004/032568 A1 | 4/2004 |

OTHER PUBLICATIONS

JP Patent Abstract 05162590 A, Jun. 29, 1993.
JP Patent Abstract 03231044 A, Oct. 15, 1991.
JP Patent Abstract 56-89194 A, Jul. 20, 1981.
JP Patent Abstract 59149494 A, Aug. 27, 1984.
JP Patent Abstract 56116396 A, Sep. 12, 1981.
Harry F. Olson, PHD., "Acoustical Engineering—Microphones," Van Nostrand Company, Inc.
A. E. Robertson, "Microphones," New York Hayden Book Co., Inc.
JP Abstract No. 55073195, published Jun. 2, 1980.
JP Abstract No. 58027496, published Feb. 18, 1983.

* cited by examiner

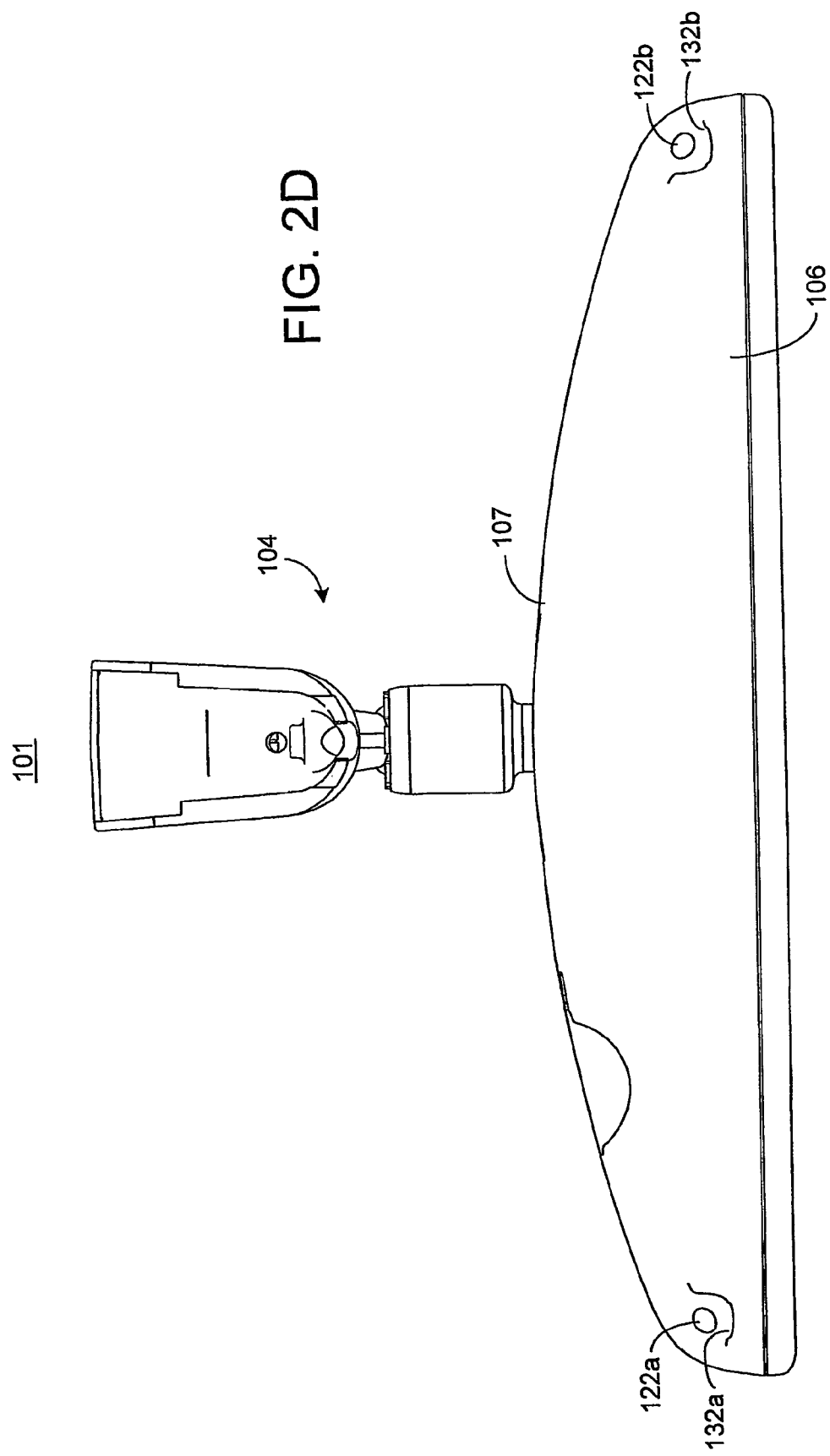

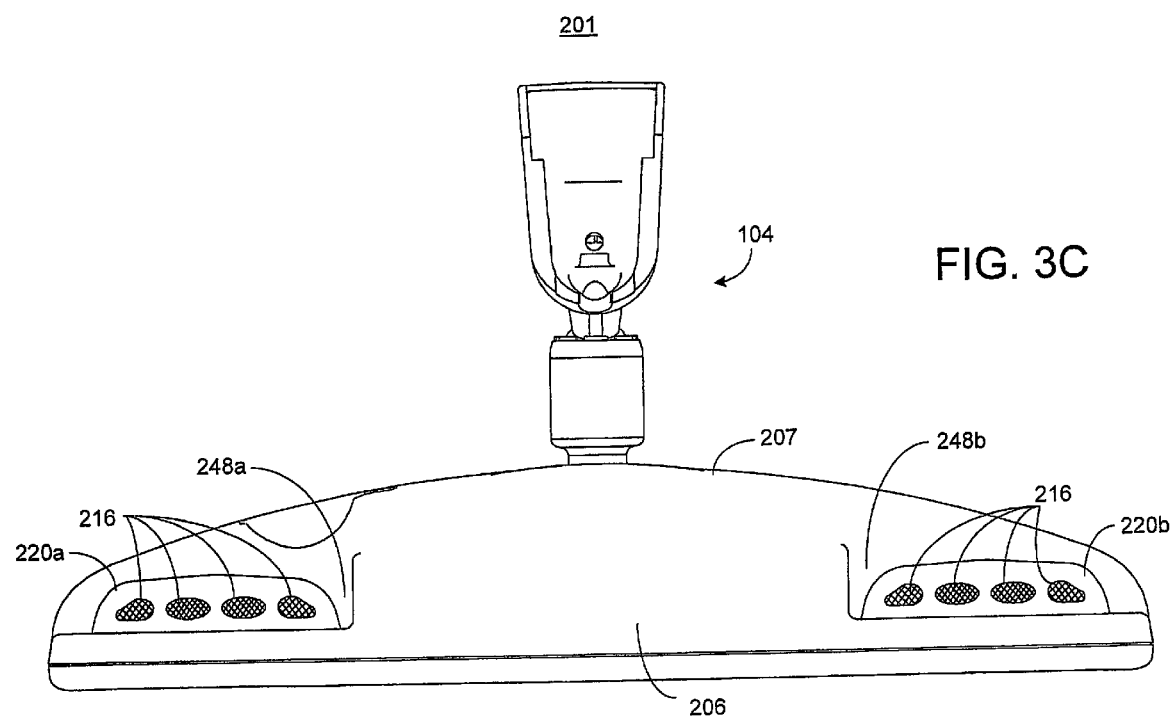

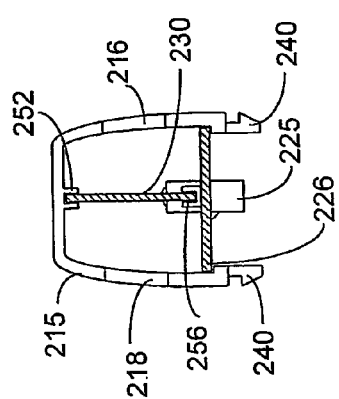
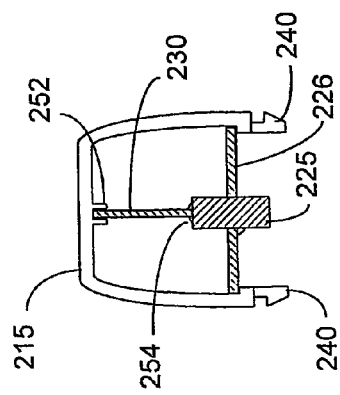
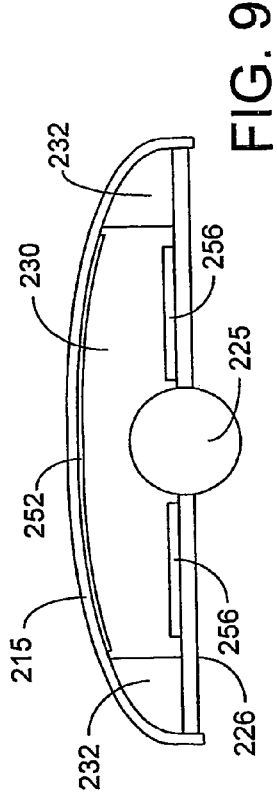
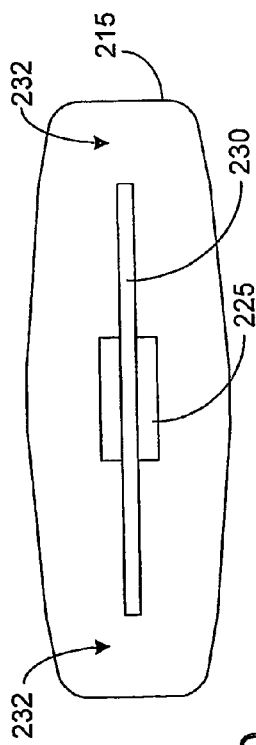
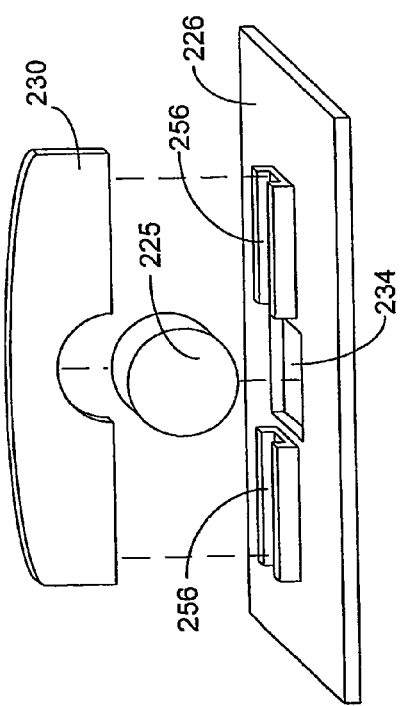

Polar of microphone with low resistance fabric at 1000 Hz

Polar of microphone with high resistance fabric at 1000 Hz

Polar of microphone with high resistance fabric and acoustic dam at 1000 Hz

VEHICLE ACCESSORY MICROPHONE

This application claims priority under 35 U.S.C. §119(e) to U.S. Provisional Application No. 60/328,538, filed on Oct. 11, 2001.

This application is also a continuation-in-part of U.S. patent application Ser. No. 10/076,158, filed on Feb. 14, 2002, which claims priority under 35 U.S.C. §19(e) to the following: U.S. Provisional Patent Application No. 60/328,538, entitled "VEHICLE ACCESSORY MICROPHONE," filed on Oct. 11, 2001 by Alan R. Watson et al.; U.S. Provisional Patent Application No. 60/314,252, entitled "VEHICLE ACCESSORY MICROPHONE," filed on Aug. 22, 2001 by Alan R. Watson et al.; U.S. Provisional Patent Application No. 60/285,811 entitled "VEHICLE ACCESSORY MICROPHONE," filed on Apr. 23, 2001 by Alan R. Watson et al.; and U.S. Provisional Patent Application No. 60/268,609 entitled "VEHICLE ACCESSORY MICROPHONE," filed on Feb. 14, 2001 by Alan R. Watson et al.

BACKGROUND OF THE INVENTION

The present invention pertains to microphones, and more particularly to a microphone associated with a vehicle accessory such as a rearview mirror assembly or the housing of a rear vision display device.

It has long been desired to provide improved microphone performance in devices such as communication devices and voice recognition devices that operate under a variety of different ambient noise conditions. Communication devices supporting hands-free operation permit the user to communicate through a microphone of a device that is not held by the user. Because of the distance between the user and the microphone, these microphones often detect undesirable noise in addition to the user's speech. The noise is difficult to attenuate. Hands-free communication systems for vehicles are particularly challenging due to the dynamically varying ambient noise that is present. For example, bi-directional communication systems such as two-way radios, cellular telephones, satellite telephones, and the like, are used in vehicles, such as automobiles, trains, airplanes and boats. For a variety of reasons, it is preferable for the communication devices of these systems to operate hands-free, such that the user need not hold the device while talking, even in the presence of high ambient noise levels subject to wide dynamic fluctuations.

Bi-directional communication systems include an audio speaker and a microphone. In order to improve hands-free performance in a vehicle communication system, a microphone is typically mounted near the driver's head. For example, a microphone is commonly attached to the vehicle visor or headliner using a fastener such as a clip, adhesive, hook and loop fastening tape (such as VELCRO® brand fastener), or the like. The audio speaker associated with the communication system is preferably positioned remote from the microphone to assist in minimizing feedback from the audio speaker to the microphone. It is common, for example, for the audio speaker to be located in a vehicle adaptor, such as a hang-up cup or a cigarette lighter plug used to provide energizing power from the vehicle electrical system to the communication device. Thus, although the communication system designer knows the position of the audio speaker in advance, the position of the microphone is unknown as the user can position the microphone where they choose. The position of the microphone relative to the person speaking will determine the level of the speech signal output by the microphone and may affect the signal-to-noise ratio. The position of the microphone relative to the audio speaker will impact on feedback between the speaker and microphone. Accordingly, the performance of the audio system is subject to the user's installation of the microphone. Additionally, the microphone will typically include a wire, which if it is mounted to the surface of the vehicle interior, will not be aesthetically pleasing. Alternatively, if the wire is to be mounted behind the interior lining, the vehicle interior must be disassembled and then reattached so that the wire can be hidden, which may result in parts that rattle loudly or hang loosely from the vehicle frame.

One potential solution to avoid these difficulties is disclosed in U.S. Pat. No. 4,930,742, entitled "REARVIEW MIRROR AND ACCESSORY MOUNT FOR VEHICLES", issued to Schofield et al. on Jun. 5, 1990, which uses a microphone in a mirror mounting support. Although locating the microphone in the mirror support provides the system designer with a microphone location that is known in advance, and avoids the problems associated with mounting the microphone after the vehicle is manufactured, there are a number of disadvantages to such an arrangement. Because the mirror is positioned between the microphone and the person speaking into the microphone, a direct unobstructed path from the user to the microphone is precluded. Additionally, the location of the microphone on the windshield detrimentally impacts on microphone design flexibility and overall noise performance of the microphone.

U.S. Pat. Nos. 5,940,503, 6,026,162, 5,566,224, 5,878,353, and D 402,905 disclose rearview mirror assemblies with a microphone mounted in the bezel of the mirror. None of these patents, however, discloses the use of acoustic ports facing multiple directions nor do they disclose microphone assemblies utilizing more than one microphone transducer. The disclosed microphone assemblies do not incorporate sufficient noise suppression components to provide output signals with relatively high signal-to-noise ratios, and do not provide a microphone having a directional sensitivity pattern or a main lobe directed forward of the housing and attenuating signals originating from the sides of the housing.

It is highly desirable to provide voice recognition systems in association with vehicle communication systems, and most preferably, such a system would enable hands-free operation. Hands-free operation of a device used in a voice recognition system is a particularly challenging application for microphones, as the accuracy of a voice recognition system is dependent upon the quality of the electrical signal representing the user's speech. Conventional hands-free microphones are not able to provide the consistency and predictability of microphone performance needed for such an application in a controlled environment such as an office, let alone in an uncontrolled and noisy environment such as an automobile.

Commonly-assigned U.S. Patent Application Publication No. 2002-0110256-A1 and PCT Application Publication No. WO 01/37519 A2 disclose various embodiments of rearview mirror-mounted microphone assemblies. In those embodiments, at least one microphone transducer is typically aimed at the driver of the vehicle. This usually results in the microphone assembly being visibly mounted to the top or bottom surface of the mirror housing. Such visibility raises certain styling concerns as well as performance issues when used in certain environments and in combination with digital signal processing circuits.

Accordingly, there is a need for a microphone for a vehicle providing improved hands-free performance and preferably enabling voice recognition operation when a digital signal processing circuit is utilized.

SUMMARY OF THE INVENTION

According to one embodiment of the present invention, an interior rearview mirror assembly for a vehicle is provided that comprises a mirror housing adapted for attachment to the interior of the vehicle. The mirror housing having a back surface generally facing the front of the vehicle and an opening generally facing the rear of the vehicle. The mirror assembly further comprises a mirror disposed in the opening of the mirror housing, and a first microphone transducer carried by the mirror housing along the back surface.

According to other aspects of the invention, an interior rearview mirror assembly for a vehicle is provided that comprises a mirror housing adapted for attachment to the interior of the vehicle. The mirror housing having a back surface generally facing the front of the vehicle and an opening generally facing the rear of the vehicle. The mirror assembly further comprises a mirror disposed in the opening of the mirror housing, a first microphone transducer carried by the mirror housing along the back surface, and a second microphone transducer carried by mirror housing along the back surface at a position laterally spaced apart from the first microphone transducer.

According to other aspects of the present invention, a microphone assembly comprises: a microphone housing defining an acoustic chamber; a circuit board; a transducer mounted to the circuit board and contained in the acoustic chamber; and an acoustic dam extending through the housing and dividing the acoustic chamber into at least two zones including at least a first zone and a second zone. The transducer includes a front face exposed to the first zone of the acoustic chamber and a rear face exposed to the second zone of the acoustic chamber.

According to another aspect of the invention, a method of constructing a microphone assembly comprises providing a microphone transducer having front and rear faces and a peripheral side edge extending around the transducer between the front and rear faces, and providing an acoustic dam around at least a portion of the peripheral side edge of the transducer to increase the acoustic path length between the front and rear faces of the transducer.

These and other features, advantages and objects of the present invention will be further understood and appreciated by those skilled in the art by reference to the following specification, claims, and appended drawings.

BRIEF DESCRIPTION OF THE DRAWINGS

The subject matter that is regarded as the invention is particularly pointed out and distinctly claimed in the claim portion that concludes the specification. The invention, together with further objects and advantages thereof, may best be understood by reference to the following description taken in conjunction with the accompanying drawings, where like numerals represent like components, and in which:

FIG. 2D is a plan view of the top of the rearview mirror assembly incorporating a microphone assembly in accordance with the first embodiment of the present invention;

FIG. 3C is a plan view of the top of the rearview mirror assembly incorporating a microphone assembly in accordance with the second embodiment of the present invention;

FIG. 7 is a cross-sectional view of the microphone assembly shown in FIG. 4 taken along line VII-VII;

FIG. 8 is a cross-sectional view of the microphone assembly shown in FIG. 4 taken along line VIII-VIII;

FIG. 9 is a cross-sectional view of the microphone assembly shown in FIG. 4 taken along line IX-IX;

FIG. 10 is a schematic top view of the microphone assembly of the second embodiment of the present invention;

FIG. 11 is an exploded perspective view of a portion of the microphone assembly of the second embodiment of the present invention;

DETAILED DESCRIPTION OF THE INVENTION

The microphone assemblies of the present invention are associated with an interior rearview mirror and have superior performance even in the presence of noise. The microphone assemblies enhance the performance of hands-free devices with which they are associated, including highly sensitive applications such as voice recognition for a telecommunication system, by improving the signal-to-noise ratio of the microphone assembly output. The microphone assemblies eliminate mechanically induced noise and provide the designer with significant freedom with respect to selection of the microphone assembly's sensitivity, frequency response and polar pattern. Additionally, circuitry can be provided for the transducer to generate an audio signal from the transducer output that has a high signal-to-noise ratio.

Figure 1:
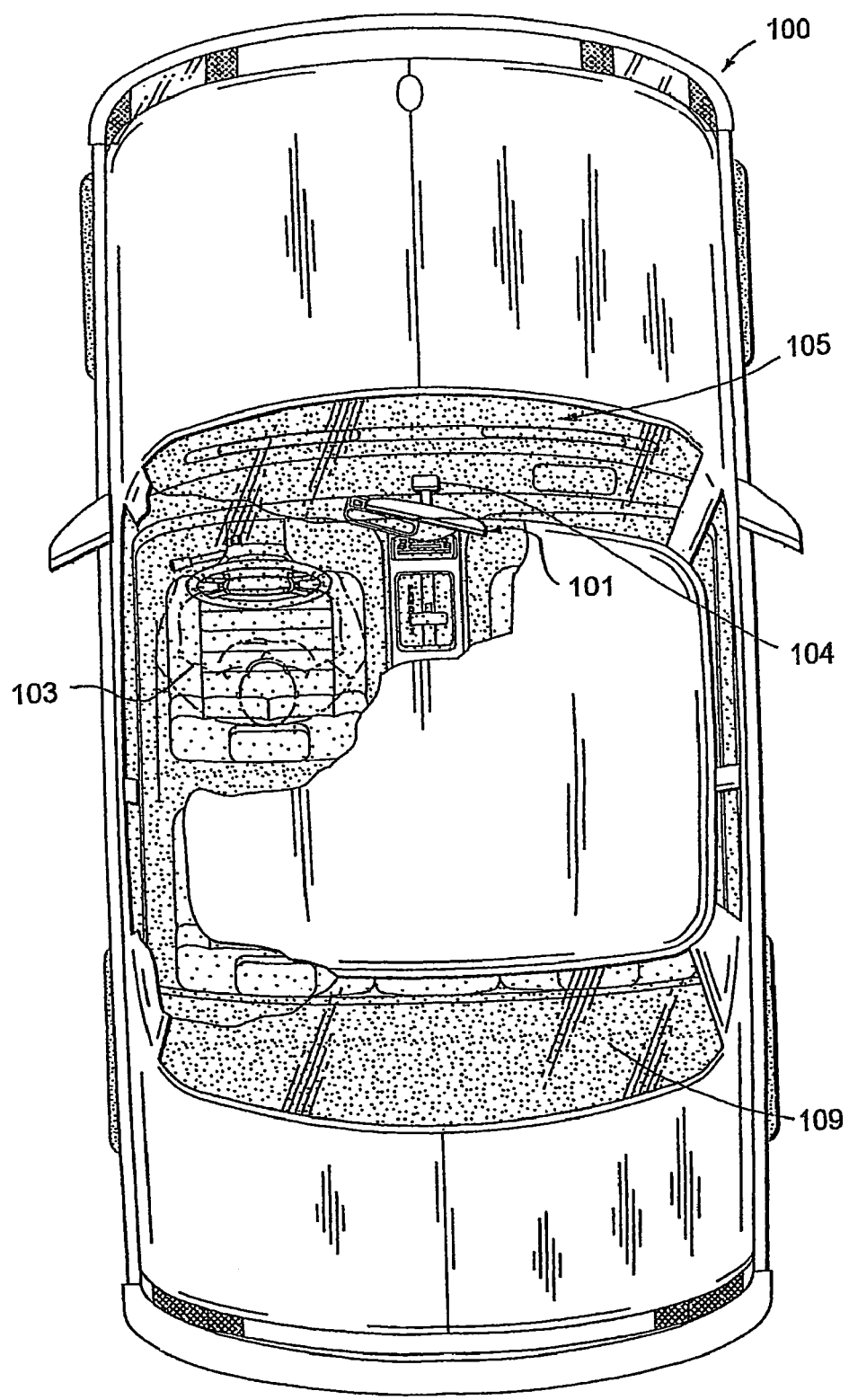
FIG. 1 is a top plan view illustrating a vehicle with a portion of the roof cut away.

A vehicle 100 (FIG. 1) includes an interior rearview mirror assembly 101 by which the vehicle operator 103 (illustrated in phantom) can view a portion of the road behind the vehicle 100 without having to turn around. The rearview mirror assembly 101 is mounted to the vehicle windshield 105, or the vehicle's headliner, via a mirror mounting support 104, in a conventional manner that facilitates electrical connection of the rearview mirror to the vehicle's electrical system and permits driver adjustment of the mirror-viewing angle.

The rearview mirror assembly 101 according to a first embodiment is shown in FIGS. 2A-2E. The mirror assembly 101 includes a mirror 108 mounted in an elongated mirror housing 106 pivotably carried on mirror support 104. The mirror 108 may be any conventional interior rearview mirror, such as a prismatic mirror of the type used with a mirror housing manually adjustable for daytime and nighttime operation, or a multiple element mirror effecting automatic reflectivity adjustment, such as an electrooptic or electrochromic mirror. The elongated mirror housing 106 may be of any conventional manufacture such as integrally molded plastic.

As will be explained in more detail below, two microphone assemblies 120a and 120b are provided along the back surface 107 of mirror housing 106 (i.e., that surface facing forward of the vehicle). As apparent from FIG. 2A, microphone assemblies 120a and 120b are not visible from the front of the mirror assembly and hence are generally not visible to the vehicle occupants.

In general, DSP processes relating to microphone arrays, beam forming, and polar steering exploit predictable phase differences between the signals obtained from transducers located at different locations. This, in turn, requires transducers to be spaced close enough to present phase difference inversion for the highest frequency addressed by the process. The first embodiment discussed below uses true time of arrival and as such can use far greater spacing or one large spacing over the entire speech bandwidth. The present invention uses the difference in polar response between the two transducers as a location determining mechanism. Unlike second order concepts, use of the difference in polar response is also independent of spacing. This concept can be implemented to separate sub-bands on the basis of origin and relative magnitude. The present embodiment uses the concept of gating. The conditions determine whether a signal or signal component are passed. This is in contrast to techniques that filter by adding or subtracting to form the passed signal. The advantage is that there is less distortion and fewer limitations on the design of the system. In broad terms, this embodiment of the invention extracts wanted sound signals from high levels of ambient noise.

This embodiment effectively creates two electronic ears that will supply signals that are free of non-acoustic noise and rich in data supporting advanced DSP processes. Specifically, these artificial ears are free of airflow and vibration noise. The degree of airflow resistance being such that flow noise is insignificant relative to the threshold of concern. Therefore, the present embodiment has no detrimental effect on resulting DSP operations. The freedom from non-acoustic noise and the presence of very significant and consistent position is then used to define a series of processes capable of extracting very natural sound and spectral content speech from vehicle conditions severe enough that speech quality is typically degraded to the point of poor vocal recognition performance. This embodiment works particularly well when provided on a rearview mirror of a vehicle insofar as the mirror is effectively positioned in "free space" and positioned such that the maximum angular separation exists between sound source locations. The preferred form uses other aspects of the mirror location such as the presence of the windshield to predict noise arrival angles and perfect the artificial ears' ability to operate effectively in this environment.

Typically, microphones in automotive applications produce very high outputs as the result of the air flowing past them. In contrast, ears have virtually no airflow sensitivity. Since airflow noise has none of the relationships expected in acoustic noise, it interferes with noise reduction processes. Artificial ears are achieved by laterally separating the microphone assemblies 120a and 120b at opposite ends of mirror housing 106 (preferably spacing the assemblies at least about 5 cm apart, more preferably about 18 cm) and by hyperextending the "D" of the transducers 125a and 125b of respective assemblies 120a and 120b to at least about 8 mm, more preferably to at least about 15 mm. This creates a very high acoustic sensitivity of one component of the audio sensing that a microphone utilizes. A secondary rear cavity (126, FIG. 2E) of greater volume is created with an acoustic resistor 128a placed at a rear port 124a with the cavity between resistor 128a and the rear of a transducer 125a. This cavity 126a increases the sound sensing mechanism to restore the relationship needed to achieve the desired polar properties. A high acoustic resistance cover 130a similar to 128a is placed over external forward port 122a to severely damp the ports.

This very high damping of both ports lowers the acoustic sensitivity and the airflow noise. Since the dominant vibration to microphone output conversion comes from the vibration of the microphone against static air, vibration noise is also reduced. The end result is a normal acoustic sensitivity with profoundly lower airflow and vibration noise. Since this is a fundamental improvement in signal to airflow noise, it applies to all airflow coming from any direction. The resulting long "D" of the microphone assembly is positioned along the rear surface of the mirror housing along a diagonal with the lower portion angled inward toward the middle and the upper portion angled outward. This results in a high degree of noise rejection for sounds coming from below the mirror along the windshield boundary and a great deal of difference for sounds coming at an angle to the common axis between the two due to the angular positioning.

Figure 2A:
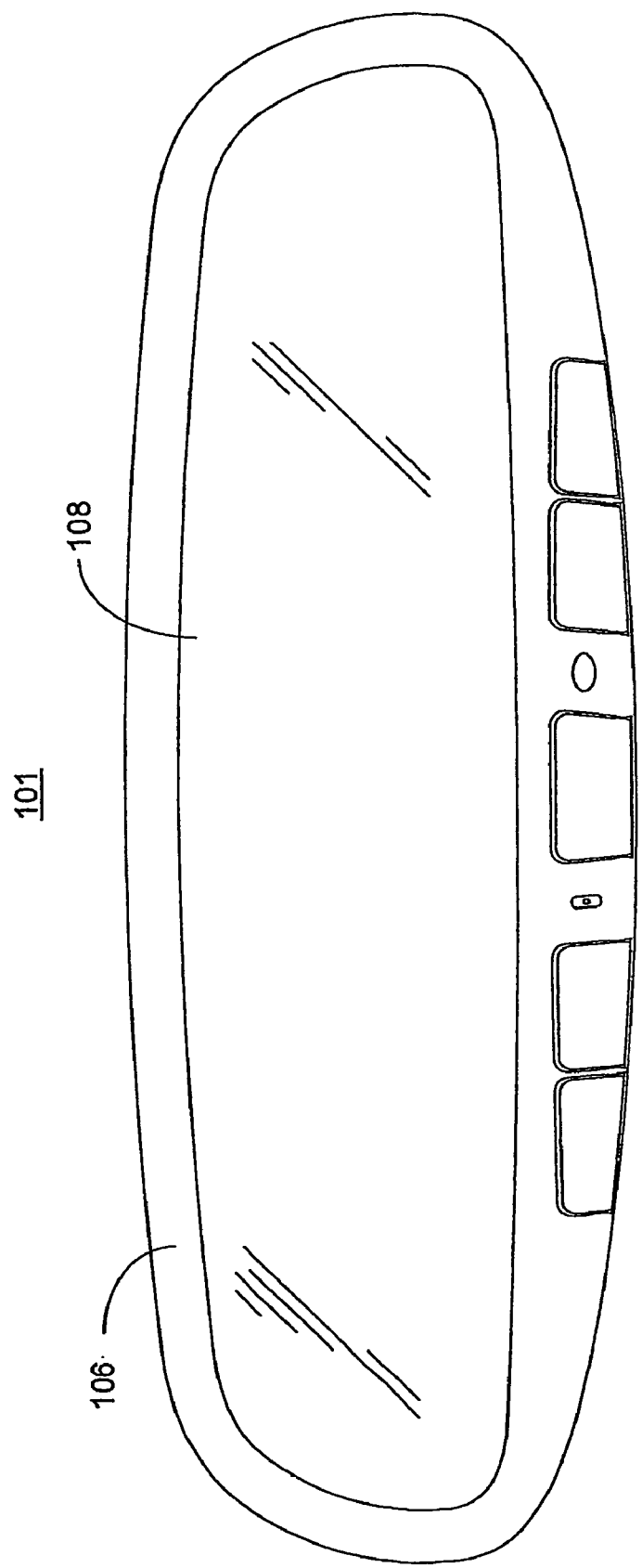
FIG. 2A is an elevational view of the front of a rearview mirror assembly incorporating a microphone assembly in accordance with a first embodiment of the present invention.
Figure 2B:
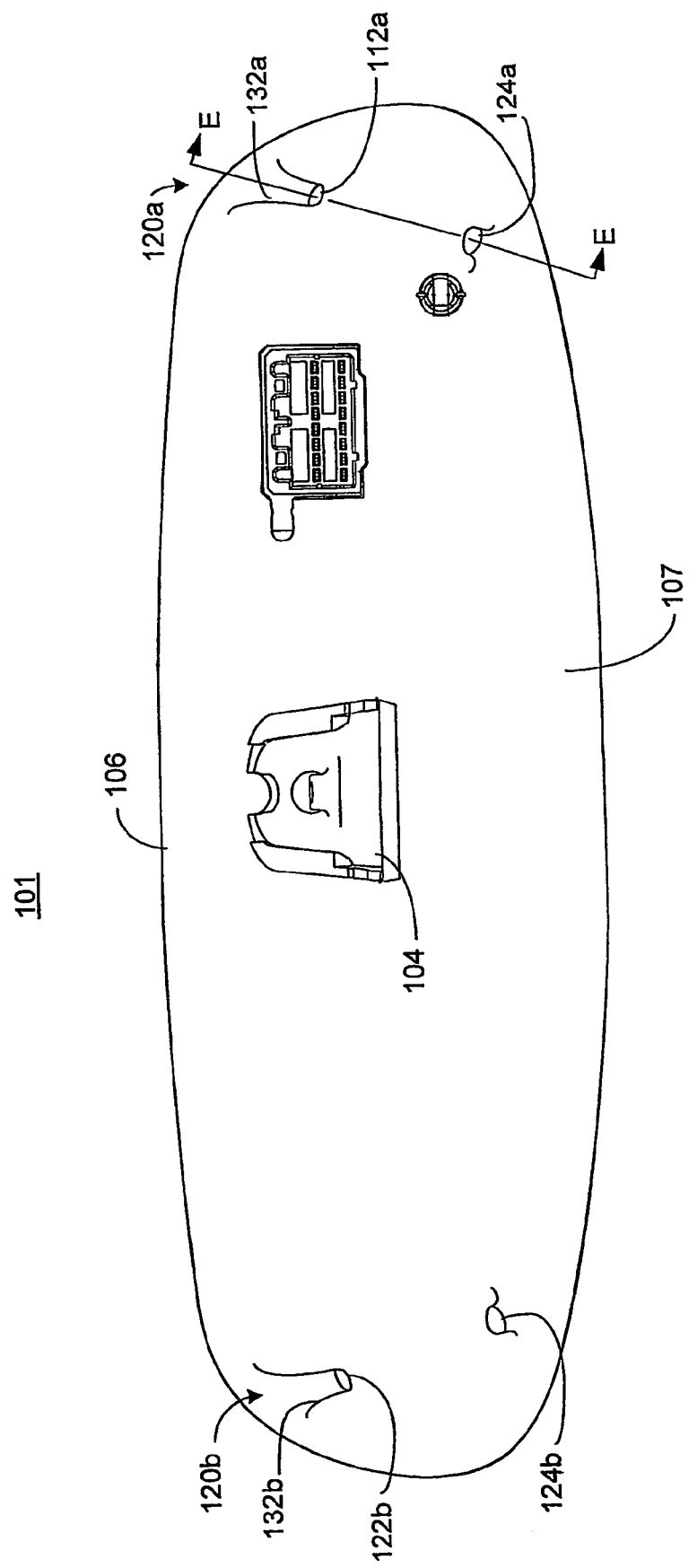
FIG. 2B is an elevational view of the rear of the rearview mirror assembly incorporating a microphone assembly in accordance with the first embodiment of the present invention.
Figure 2C:
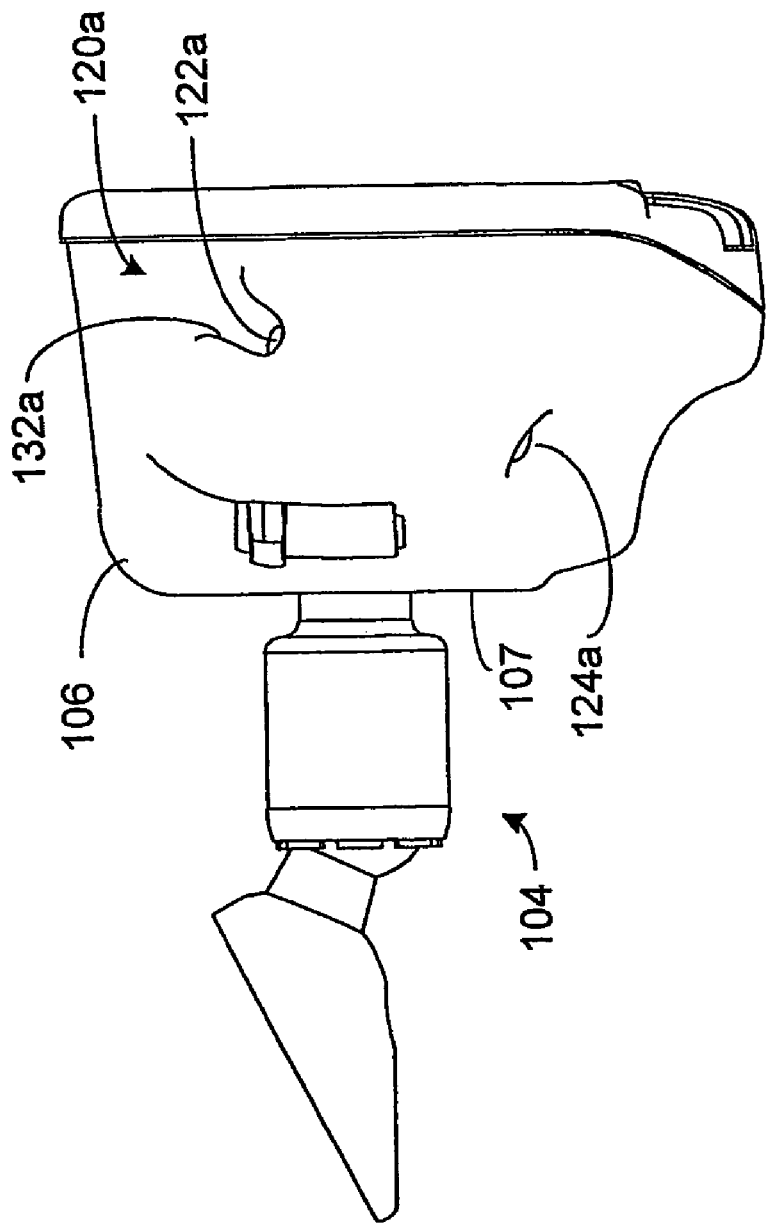
FIG. 2C is an elevational view of one side of the rearview mirror assembly incorporating a microphone assembly in accordance with the first embodiment of the present invention.
Figure 2E:
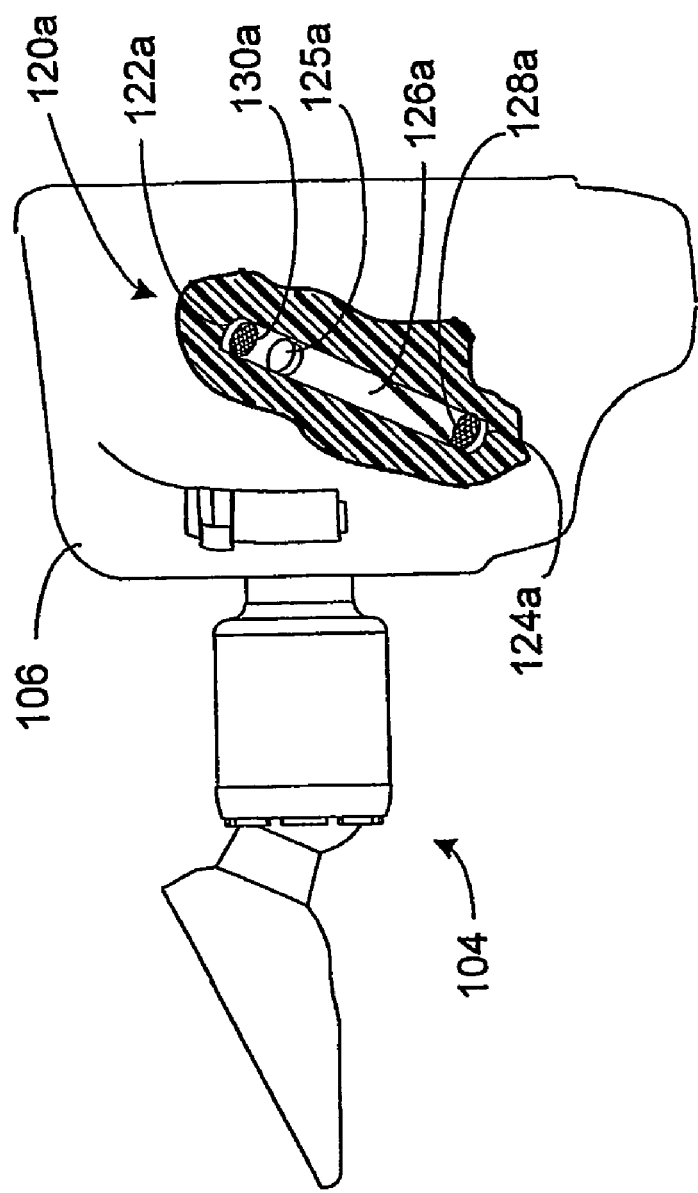
FIG. 2E is an elevational view of one side of the rearview mirror assembly in partial cross-section taken along line E-E in FIG. 2B.
Figure 3A:
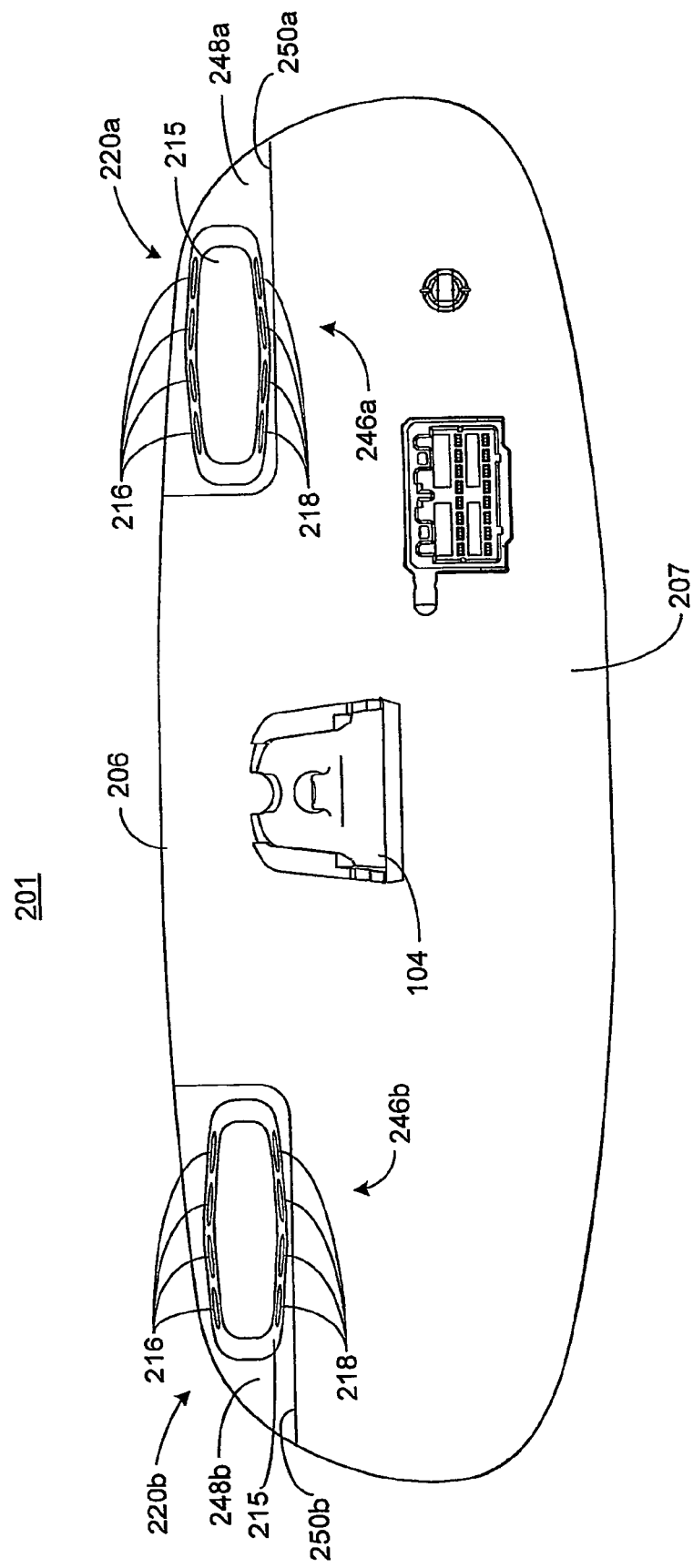
FIG. 3A is an elevational view of the rear of the rearview mirror assembly incorporating a microphone assembly in accordance with the second embodiment of the present invention.
Figure 3B:
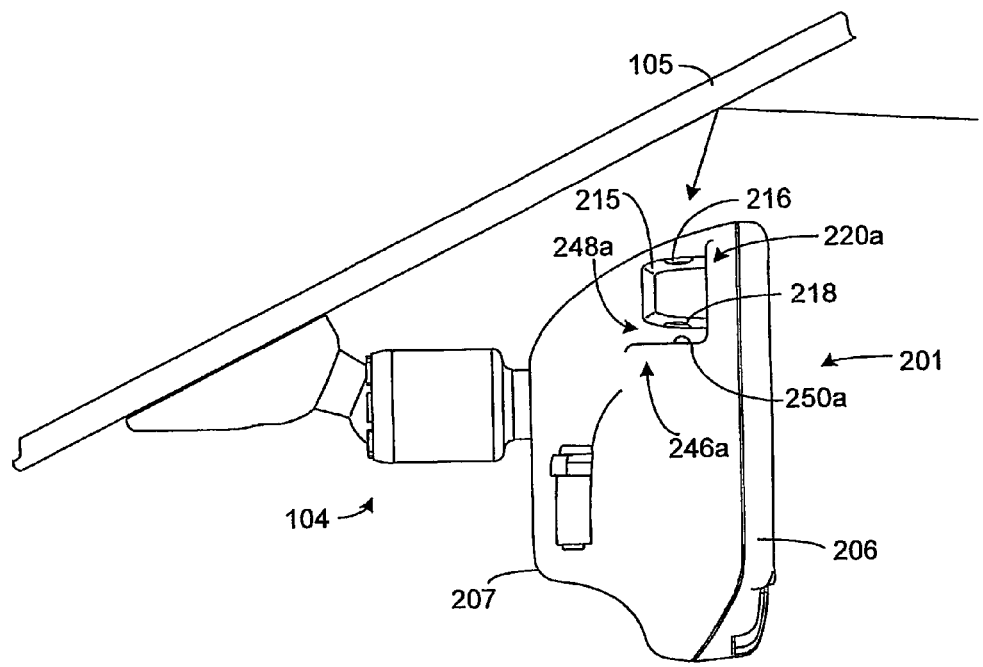
FIG. 3B is an elevational view of one side of the rearview mirror assembly incorporating a microphone assembly in accordance with the second embodiment of the present invention.
Figure 3D:
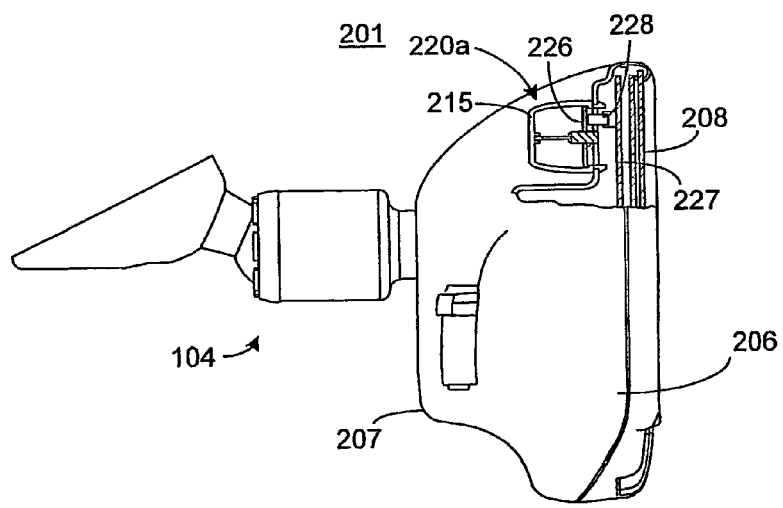
FIG. 3D is an elevational view of one side of the rearview mirror assembly in partial cross-section taken along line D-D in FIG. 3C.

The use of the hyperlong "D" improves greatly the directional properties for the majority of the passed band. Higher frequencies are not necessarily helped. This deficit is addressed by adding directional means such as a partially horned (or flared) opening 132a, 132b toward the forward port 122a, 122b (FIG. 2B-2D). While frequency response may be negatively impacted, this aspect may be corrected by electronic equalization ideally done prior to digitization.

By providing similar constructions on opposite sides of the rearview mirror housing 106, two signals may be obtained that are free from airflow noise and that reject the dominant spatial noise location, each with a very high degree of directionality and each aimed to provide a great degree of spectral difference related to source angular position. Since microphone assemblies 120a and 120b are widely spaced, there is also a significant arrival time difference. These "artificial ears" produce all the data types and freedom from unwanted airflow and mechanical noise needed for the companion DSP algorithms. The DSP algorithms may thus exploit the additional data and enjoy the freedom from non-acoustic noise content.

The preferred default for most applications is to have the DSP provide no signal until speech is detected. Thus, the preferred process is based on not passing a signal unless the speech detection criteria are met as opposed to always passing the signal and trying to lower the noise content. While this may provide processing delays, compensation can be accomplished by providing a slight delay in the delivered signal to allow processing and yet not use the first utterance of a spoken word. The process begins with the determination in each ear channel that a change in the input has occurred consistent with a speech utterance. This is a well-established DSP process. The difference in the case of the present invention is that this action is done in two channels by only passing speech-like events. The present invention avoids times when speech content is so low that it is virtually useless. The threshold may be set higher for more robust vocal recognition and better speech quality or may be set lower for higher noise to speech situations. The time of arrival may then be utilized to begin the process of processing only that speech from the desired spatial location (i.e., the location in which the driver or other passengers are located). Incorrect arrival time difference will narrow the possibly conflicting noises to those arriving source locations around the line connecting the two transducer's center lines. Then, by applying the DSP's stored knowledge of the desired user, and of human speech in general, the user's fundamental frequencies may be determined to create a comb pass filter. The result is that only those bands likely to contain speech are present. This is most effective in the bands dominated by vocal cord sounds. At this point, any bands are passed that are likely to contain speech and only those sounds from the correct location and only those sounds that vary like speech are passed. The relative spectral content may then be used to further add location separation. For every spatial location, one can map the relative frequency responses for that entry angle for both signals. One would only need to address those regions where speech bands are present. By comparing the difference in spectral content of the two signals from microphone assemblies 120a and 120b, the DSP can determine if the current dominant signals are coming from the focussed location. Even more useful, the DSP can determine if a time varying band in the passed bands originates from other than the focussed location. This is achieved by comparing the relative magnitudes to the response maps. For example, if the difference should be +3 dB left versus right, and the difference is −2 dB, the DSP will know that this particular band did not originate at the focussed spatial location and can be removed. At this point, only speech sounds from the desired location have been passed. At this time, the DSP's knowledge of the target user may be used to reconstruct missing speech bands. Specifically, there will be bands where there is important speech content, but the speech content is not large enough to be significant and will be lost in the filtering process. Humans know what a speaking person sounds like from less noisy times and apply that knowledge during very high noise conditions to extrapolate the speech bands. The DSP may use the same form of processing. Specifically, over time, the DSP may generate a harmonic amplitude map for the range of observed fundamental frequencies. If the fundamental frequency is known, it may be used as the map reference and extract the relative magnitudes of the harmonics. Since every human has a consistent harmonic map, as the result of fixed head cavities, the DSP can apply the known harmonic amplitudes to estimate the missing ones. For example, human speech usually loses its high frequency content in very high noise environments. In lesser noise, where some of the high bands are not lost, knowledge may be gained of this speech and used to fill in the missing bands in the higher noise environments.

The sequence of filters and the number of filters used can vary depending on need, benefit, or cost. The key being to exploit the rich data derived from the artificial ears and the knowledge of the speaking human to yield speech free from the detrimental effects of high noise. With reference to FIGS. 2A-2E, it is noted that the two microphone assemblies 120a and 120b are integrated into the rear of the mirror housing 106 and are disposed such that the central axes of the transducers provided in these assemblies are at an angle with respect to one another and with respect to a normal to the mirror surface. Further, the transducer central axes are aimed at an angle upward relative to the position of the driver. This allows the microphone assemblies to be integrated more to the rear of the mirror assembly and somewhat obscured from the view of the driver or other passengers.

While the above embodiment addresses the problems in the automotive environment on a broadband basis, the transducers used may be omni-directional and the DSP could utilize time of arrival for the lower frequency bands while using the directional characteristics provided by the horn at the forward port for the higher frequency bands.

A preferred second embodiment of an interior rearview mirror assembly 201 of the present invention is shown in FIGS. 3A-3D. The front view of interior rearview mirror assembly 201 is not shown insofar as its appearance would be similar to the interior rearview mirror assembly 101 shown in FIG. 2A. As shown in FIGS. 3A-3D and as described below, the microphone assemblies 220a and 220b are also mounted on the back surface 207 of the mirror housing 206 and are not visible from the front of the mirror assembly.

Figure 4:
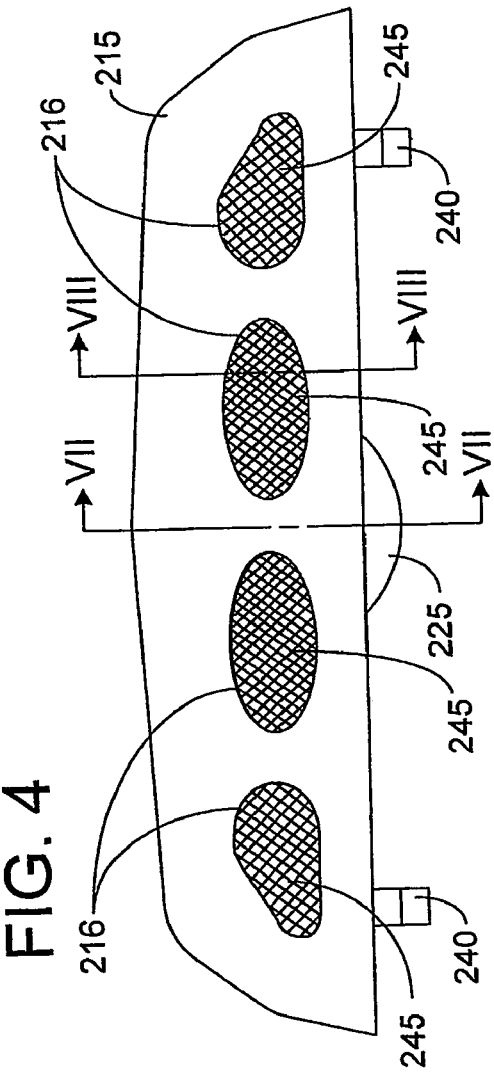
FIG. 4 is an elevational view of the front of the microphone assembly of the second embodiment of the present invention.
Figure 6:
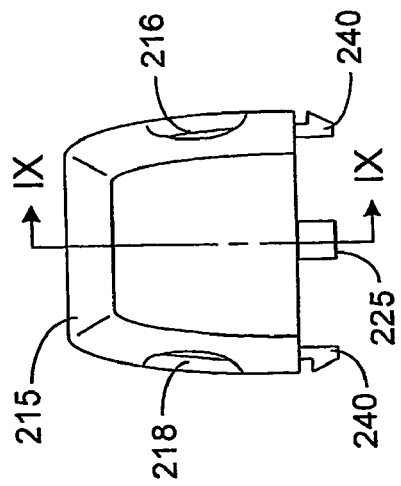
FIG. 6 is an elevational view of one end of the microphone assembly of the second embodiment of the present invention.
Figure 5:
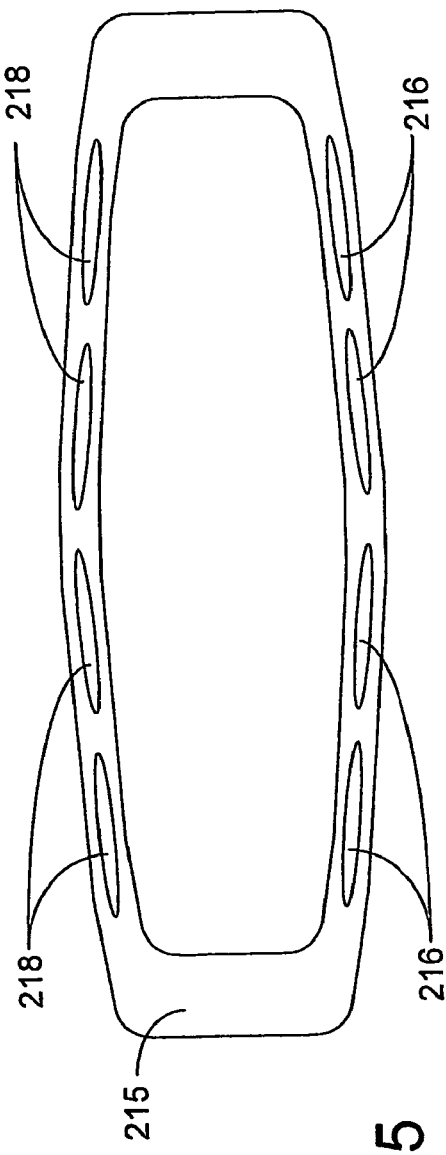
FIG. 5 is a plan view of the top of the microphone assembly of the second embodiment of the present invention.

The microphone assemblies 220a and 220b are preferably mounted on the mirror assembly and may be substantially identical. Only one of the two microphone assemblies is shown and described in detail. Microphone assembly 220a includes a microphone housing 215, a transducer 225, and a circuit board 226. The microphone housing 215 (FIGS. 4-6) is generally rectangular, although the housing could have a generally square foot print, an elongated elliptical or rectangular foot print, or any other shape desired by the microphone designer. The microphone housing 215 includes front ports 216 that face upwards and rear ports 218 that downward. The ports 216 and 218 provide sound passages through the microphone housing. The ports 216, 218 can have any suitable opening shape or size. In the embodiment shown in FIGS. 3A-11, microphone housing 215 includes four front ports 216a-216d provided in the front surface (i.e., the side of the housing facing upward) of microphone housing 215, and four rear ports 218a-218d in the rear surface (i.e., the side of the housing facing downward) of microphone housing 215. The front and rear ports are similar in shape and position and are preferably symmetrical.

The microphone housing 215 also includes resilient mounting tabs 240 for insertion into openings (not shown) in the back surface of mirror housing 206 to thereby secure microphone assembly 220a to mirror housing 206. For example, the tabs can be generally L-shaped in profile for insertion into the mirror housing 206. Alternately, the tabs 240 can be elongate snap connectors that slide into an opening (not shown) in the back surface of the mirror housing and snap into engagement with the inside surface of the mirror housing 206 after full insertion. The microphone housing 215 can be integrally molded plastic, stamped metal, or of any other suitable manufacture.

The transducers 225 used in the microphone assemblies 220a and 220b are preferably substantially identical. The transducers 225 can be any suitable, conventional transducers, such as electret, piezoelectric, or condenser transducers. The transducers may be, for example, electret transducers such as those commercially available from Matsushita of America (doing business as Panasonic), and may advantageously be unidirectional transducers. If electret transducers are employed, the transducers can be suitably conditioned to better maintain transducer performance over the life of the microphone assemblies. For example, the diaphragms of the transducers 225 can be baked prior to assembly into the transducers.

The circuit board 226 has a conductive layer on one of its surfaces that is etched and electrically connected to the leads of transducer 225. The transducer leads may be connected to a pre-processing circuit that may be mounted to the conductive layer of circuit board 226. Although the pre-preprocessing circuit can be mounted on the circuit board 226 in the microphone housing, it will be recognized that the such a circuit as well as other circuits such as a digital signal processor (DSP) can alternatively be mounted on a printed circuit board 227 (FIG. 3D) in the mirror housing 206, and further that in the case of an electrooptic mirror, such as an electrochromic mirror 208, the circuits can be mounted on a common circuit board with the mirror electrical components, or the circuits and the mirror electrical components can be mounted on separate circuit boards within the mirror housing 206. Further still, such processing circuits may be located elsewhere in the vehicle, such as in the mirror assembly mount, an overhead console, an on-window console, an A-pillar, or in other locations. Examples of such processing and pre-processing circuits are disclosed in commonly assigned U.S. Patent Application Publication No. 2002-0110256-A1.

The electrical connection of the transducer leads and the components of an pre-processing or other processing circuit, are preferably by electrical traces in the conductive layer of the circuit board, formed by conventional means such as etching, and vias extending through the dielectric substrate of the printed circuit board. The circuit board may include holes for receipt of posts on microphone housing 215. Such posts may be heat-staked to the circuit board substrate after the posts are inserted through the holes therein to secure the connection of the circuit board 226 to the microphone housing 215 and insure that the microphone assembly provides acoustically isolated sound channels between the transducer 225 and the ports 216 and 218, as described in greater detail herein below.

To assemble the microphone assembly 220a, the transducer 225 is first mounted on the circuit board 226. As will be described in detail below, an acoustic dam 230 (FIGS. 7-11) is preferably inserted between the circuit board 226 and microphone housing 215. The transducer 225, circuit board 226, is then secured to the microphone housing 215 with the acoustic dam 230 therebetween.

Microphone transducer 225 is preferably mounted sideways through a hole 234 formed in printed circuit board 226. A portion of transducer 225 would thus extend below the bottom surface of circuit board 226 and a portion would also extend above a top surface of printed circuit board 226. Mounting the transducer in this orientation and position relative to the circuit board provides several advantages. First, the electrical contacts on the transducers may be directly soldered to traces on the printed circuit board. This avoids the need for manually connecting wires to the transducer contacts and subsequently manually connecting those wires to the circuit board. Thus, the transducer may be mounted to the circuit board using conventional circuit board populating devices.

Another advantage of mounting the transducers such that they extend above and below the surfaces of the printed circuit board is that one side of the circuit board may include a conductive layer serving as a ground plane. Such a ground plane may shield the transducers from electromagnetic interference (EMI) that may be produced by other components within the rearview mirror assembly or in other components within the vehicle. Such EMI can introduce significant noise into the signal delivered by the transducers. In a preferred embodiment, each transducer is mounted in a circuit board having a conductive ground plane facing the acoustically active portion of the transducer while the circuit components are mounted to the opposite side.

Microphone subassembly 120 further includes a windscreen 142, which protects the transducer and circuit board from the external environment. Windscreen 142 is preferably made of a hydrophobic heat-sensitive adhesive-coated fabric and is adhesively attached to the underside and inner surfaces microphone housing 215 across ports 216 and 218. Microphone housing 215 is preferably tightly bonded about circuit board 226 to provide a water-impervious enclosure for transducer 225.

While it has been typical in conventional microphones to minimize the acoustic resistivity of a windscreen by increasing the porosity of the windscreen, the microphone assembly of the present invention advantageously utilizes a windscreen with a higher acoustic resistivity by decreasing the porosity of windscreen and yet obtaining not only better water-resistant properties, but to also improved the acoustic characteristics for the microphone assembly. The use of a high resistively windscreen is particularly advantageous when the microphone assembly is mounted on a rearview mirror assembly since significant noise may be introduced from the windshield defroster. Specifically, the acoustic resistivity of windscreen 242 may be increased to at least about 1 acoustic $\Omega/cm^2$ and preferably has an acoustic resistivity of at least about 2 acoustic $\Omega/cm^2$, and more preferably has an acoustic resistivity of at least about 8 to 9 acoustic $\Omega/cm^2$. Further, as described below, the acoustic resistivity of windscreen 242 may be varied to also vary the directionality and polarity of the microphone assembly.

With the microphone transducers 225 of the two microphone assemblies 220a and 220b sealed in separate housings and having their own windscreens, the ports and acoustic resistivity of the windscreens may be different for the different microphone assemblies transducers so as to compensate for any effects experienced by the transducers as a result of the positioning of the transducers on the vehicle accessory. For example, when one microphone assembly (i.e., 220a) is to be positioned closer to the windshield as a result of typical tilting of mirror housing 206, its polar pattern may be slightly different from that of the other microphone assembly 220b. Thus, by selecting an appropriate microphone housing design/port configuration, and windscreen resistivity, the effects of the differences resulting from the positioning of the transducers of the two assemblies may be compensated such that the transducers exhibit substantially similar polar patterns and other characteristics. While the windscreen has been described above as consisting of a hydrophobic fabric, it will be appreciated that the windscreen may be molded integrally across the ports of the microphone housing. Such an arrangement would simplify the manufacturing of the microphone assembly by requiring less parts and less manufacturing steps. Further, it would more likely provide a more effective seal between the windscreen and the microphone housing.

To attempt to obtain a required sensitivity accuracy for the transducers, a laser trim tab may be added to the gain stage connected to each transducer. The transducers may then be acoustically excited by a calibrated sound source and the output of the transducers is monitored. The laser trim tab is then trimmed to precisely set the gain and thereby obtain precise sensitivity accuracy.

A problem with mounting microphone subassemblies to the top or back of the mirror housing results from the fact that the microphone assemblies are closer to the windshield. When the windshield defroster is activated, a sheet of air travels upward along the windshield. Thus, when the microphone subassemblies are placed on the back or top of the mirror housing, it is exposed to more airflow as the air from the defroster passes between the mirror housing and the window past the microphone subassembly. This airflow creates turbulence as it passes over the microphone subassembly, which creates a significant amount of noise.

To solve this problem when the microphone assembly is mounted to the top of a rearview mirror housing, commonly-assigned U.S. Patent Application Publication No. 2002-0110256-A1 and PCT Application Publication No. WO 01/37519 A2 disclose the use of a deflector that extends upward from the rear of the mirror housing so as to smoothly deflect the airflow from the defroster over and/or beside microphone subassembly so that it does not impact the transducers or create any turbulence as it passes over and around the microphone assembly. Because the airflow primarily would enter the rear of the microphone subassembly, the deflectors are designed to redirect the air with minimal impact on the frequency response of the microphone subassembly. This is important for high intelligibility in the motor vehicle environment. With no direct air impact and the avoidance of turbulence near the microphone subassembly, the microphone assembly may advantageously be mounted on the top of the mirror housing can offer superior resistance to airflow-generated noise.

As described above, the microphone assemblies used in the second embodiment have rear ports 218 that open downward. Normally this would pose a serious problem since the defroster airflow would directly strike these rear ports and thus generate significant noise. As described above and in detail below, the use of a very high acoustic resistivity windscreen 242 significantly reduces the noise level caused by such airflow. Nevertheless, it is also advantageous to configure the back surface 207 of mirror housing 206 such that integral deflectors 246a and 246b are provided proximate the lower (rear) surface of the microphone assemblies 220a and 220b so as to reduce or prevent such airflow from directly striking the microphone assemblies. Deflectors 246a and 246b may be provided by mounting the microphone assemblies 220a and 220b in recessed portions 248a and 248b of back surface 207 of mirror housing 206. Such recesses would each include a wall 250a and 250b that has a height that is generally equal to or greater than the height of microphone housing 215. Wall 250a and 250b may be flat, tapered and/or contoured around the lower wall and one end of microphone housing 215. Preferably, recesses 248a and 248b would not have any walls opposite walls 250a and 250b such that front ports 216 of microphone housing 215 open upwards and are unobstructed by any other structure on the mirror housing.

As shown in the drawings, the combination of the mounting of the microphone assemblies 220a and 220b on the back surface 207 of mirror housing 206 and the mounting of the transducers 225 in microphone housings 215 in the orientation shown, results in the central axis of the transducers 225 extending generally vertically. Normal tilting of the mirror housing 206 may result in the central axis tilted nearly parallel to the windshield 105 of the vehicle 100. As described below, such positioning and orientation of the transducers 225 results in several advantages.

One advantage is that the transducers may be mounted in a through-hole fashion as discussed above, while the circuit board 226 may be mounted substantially parallel to a surface of mirror 208, most likely the rear surface of mirror 208. If the mirror 208 is an electro-optic mirror, a mother board 227 is typically provided in the mirror housing 206 parallel to the rear surface of mirror 208 (see FIG. 3D). Thus, circuit board 226 would be substantially parallel to mother board 227 and could be readily electrically coupled to mother board 227 using conventional connector plugs 228. Additionally, by having both circuit boards in parallel with one another and in parallel with the rear surface of mirror 208, less space need be provided in mirror housing 206 to accommodate these components.

By being located on the back 207 of the mirror housing 206 and in the basic plane of mirror 208, the virtual axis of microphone assembly 220a is aimed upward. This in turn means the rear aligns with the windshield boundary, since noise is greatest along this boundary this alignment offers the greatest average noise rejection. In other words this aiming condition lowers the noise from common sources including defroster fan and duct noise, road noise, rain noise, and wind-on-windshield noise.

Another benefit of upward aiming and being just behind the forward surface of mirror housing 215 is freedom from the comb effect. All high frequency sounds from the vehicle cabin enter the microphone by reflecting off the windshield and/or headliner at which microphone assemblies 220a and 220b are aimed (See FIG. 3C). Direct high frequency sound is stopped by the front surface of the mirror. Since comb effect occurs when two identical signals mix with different arrival times, the removal of the direct sound lowers the high frequency signals to only one. Comb effect is a very disruptive condition as it removes almost completely regions of the band. These missing regions contain important sonic data that when lost impairs voice recognition and it makes human speech sound hollow and reverberant.

Another benefit of mounting the microphone assemblies 220a and 220b to the rear surface and the ends of mirror housing 206 is that the mirror physically blocks high frequency sounds coming from directions in which the sound path would pass through the mirror 208 to reach the microphone assembly 220a, 220b. Placing the microphone assemblies 220a, 220b into notched recesses 248a, 248b at each end the mirror housing 206 imparts a great deal of increased directional ability in the higher frequency portion of the band roughly 2500 Hz and above.

Prior art array microphones are based on the use of the same basic directional aspect. This is often a requirement such that when time of arrival is adjusted the speech signals will add. Differences in aiming angle would interfere with this addition for sounds coming off axis which the array aiming ability requires. In prior art arrays, the microphone transducers must be placed close enough together to achieve time alignment by simple maximization of signal. This prevents wide spacing relative to the wavelength of the highest frequency sound in the pass band. Conversely, a wide enough separation is often required to have a difference of meaningful size when the wavelength decreases. The combination of these two effects forces the use of more the two transducers to get effective array microphone operation trough the entire audio band.

The inventive second embodiment manifests directional attributes that are nearly identical through the mid and lower frequencies. Since the microphone assemblies are also widely separated they function effectively in the mid and lower frequencies. Since the microphone assemblies are too widely separated for conventional array functionality in the higher frequencies, it may be desirable to add an additional means to achieve beam steering.

The mirror-added directional ability provides this second beam forming means. Since there is very significant difference in the high frequency output for a given point in space, amplitude comparison can be used to augment time of arrival extending beam forming beyond that supported by the spacing. In effect, the two microphone transducers yield the functionality of four.

In terms of spacing dimensions, advantages arise as the spacing is increased from 3 inches, the greatest spacing possible for a top frequency of roughly 5 kHz, with increasing advantage until the spacing increases beyond the point of high frequency directional onset, 2.5 kHz or 6 inches. The onset of high frequency directional function is progressive so the actual range of maximum separation can vary from 5 to 7 inches.

Another advantageous aspect is the styling freedom offered by recessed rear mounting. The microphone is not visible from the cab and lies on a large surface supporting a large microphone with no additional size or protrusions. Further by avoiding the central area of the mirror housing, the microphone assemblies do not interfere with mounting or wiring. Since the center of the mirror housing must be strong to resist vibration avoidance of the center also preserves the ability to effectively use reinforcing ribs and other strength enhancing details.

To gain the full benefits from mounting the microphone assemblies on the rear surface of the mirror housing, acoustic dam 230 may be employed. This is because the microphone assemblies are preferably recessed into the mirror housing to protect the rear ports 218 from direct air impingement from defroster airflow. This situation in turn decreases the effective "D" by adding delay to the sound arriving at the rear port. Sound traveling from the rear to the front takes some additional time to reach the rear port. The difference between the arrival at the front or rear forms the phase difference that produces the null. This difference is reduced altering the resulting null angle. In other words, the microphone should be made more directional to have the correct manifested directional properties when recessed into the rear of the mirror housing.

All prior art assumes the transducer portion is free within the containment shell. In other words, sound waves are passing by the transducer and it responds to them as passing waves. In the case of "D" extension a greater portion of the available pressure difference from these passing waves is yielded. This is used to compensate for reduced wave intensity due to the impact of the port resistance of the outer shell.

The acoustic dam 230 does not function like a "D" extender but rather forms additional pressure difference effectively funneling acoustic energy into the transducer. This is accomplished by dividing the interior space into acoustic zones. It is the difference in external "D" between these regions that causes the increased pressure difference.

For example, in the second embodiment, dam 230 forms defined regions of the outer grill that impact specific zones since transducer 225 passes through a hole in dam 230, one side is the virtual front of the transducer and the other the back. The center of the port area feeding each zone acts like the port of a microphone of that size. In other words, if these ports on the average are 1 inch apart then the microphone has an effective external "D" of 1 inch. The virtual aiming direction is also determined by this center of area location. In other words, if the microphone is aligned straight forward but the two virtual ports are rotated 45 degrees, then the aiming point for the actual microphone will be rotated 45 degrees.

In the second embodiment shown in FIGS. 7-11, dam 230 does not completely separate the zones it forms when dividing the acoustic chamber defined by the housing 215 and circuit board 226. This allows the pressure to equalize between the zones. Flowing air creates different pressures in each zone by connecting these zones this pressure difference is reduced. This connection does not impact acoustic pressure differences because they are the result of a consistent external pressure difference and because flowing air noise is a near DC phenomena. The length of the dam 230 in relation to the length of the open acoustic chamber area determines the weighting factor of the external ports 216 and 218. Those ports near or over the open regions 232 have little impact on the virtual "D" and conversely those farthest from the openings 232 have the greatest impact. As a result dam width can be used to tune the design to optimize the desired directional aspects and the flowing air rejection. The best ratios are from 50% dam to 90% dam.

The dam extends and acoustically seals the typically narrow thickness dimension of the microphone housing 215. Any gap close to the center of the dammed zones allows the pressure difference to cross equalize thereby lowering the difference the transducer perceives. Thus, as shown in FIGS. 7-9 and 11, groove forming members 250 may be provided on the top of circuit board 226 so as to receive and hold acoustic dam 230 and thereby ensure an acoustic seal between the dam and the circuit board. Similarly, a groove 252 may be provided on the top inner surface of microphone housing 215 to receive, hold and create an acoustic seal with dam 230. To enhance the acoustic seal of dam 230 about the periphery of transducer 225, an epoxy 254 may be applied therebetween.

Figure 12:
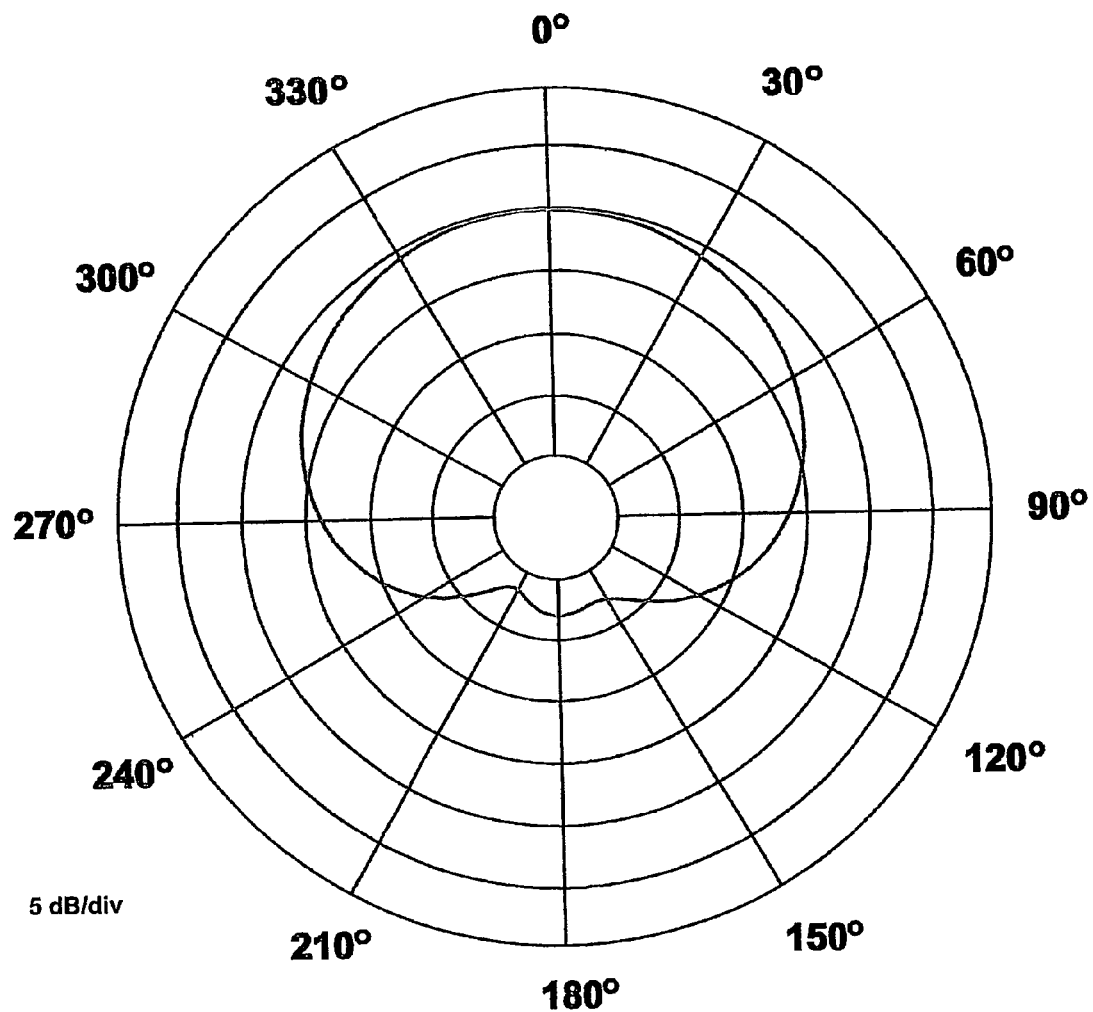
FIG. 12 is a polar plot taken of a rearview mirror assembly of the present invention having a microphone assembly with a low acoustic resistance windscreen.
Figure 13:
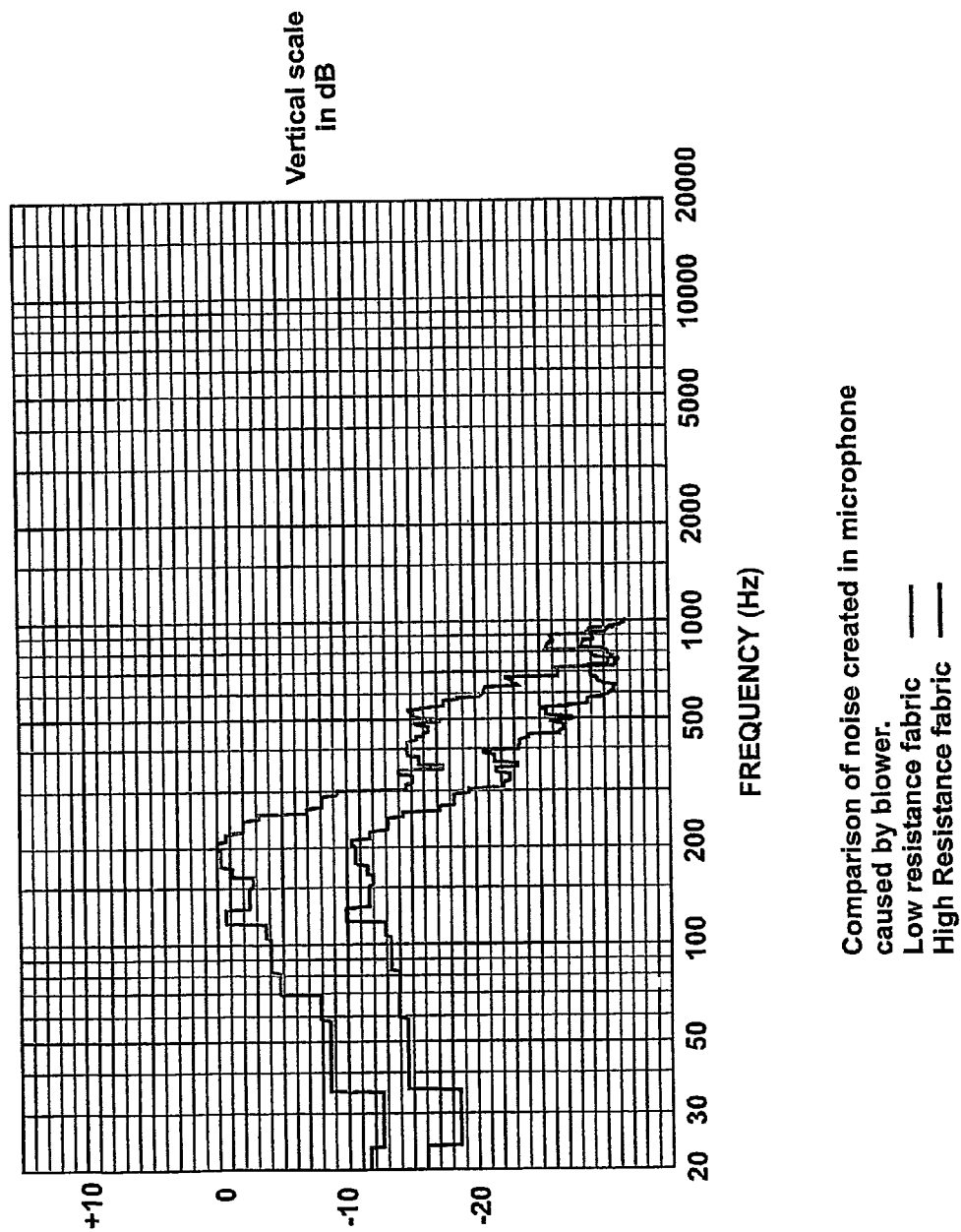
FIG. 13 is a comparative noise plot taken of two different rearview mirror assemblies of the present invention, one having a microphone assembly with a low acoustic resistance windscreen and the other one having a microphone assembly with a very high acoustic resistance windscreen.

To demonstrate the effectiveness of acoustic dam 230 in combination with a very high acoustic resistivity windscreen 242, a three different prototype rearview mirror assemblies were constructed having microphone assemblies similar to the second embodiment described above and shown in FIGS. 3A-11. The first prototype used a windscreen with a low acoustic resistivity fabric. A polar plot was obtained for this first prototype at 1000 Hz. A copy of the polar plot is shown in FIG. 12. Note the directional sensitivity of this polar pattern is generally what is desired so as to have greatest sensitivity upward (i.e., at 0 degrees) and the lowest sensitivity downward towards the defroster. Unfortunately, despite the low sensitivity downward, this first prototype remains relatively sensitive to noise caused by the laminar airflow from the defroster that travels up the windshield of the vehicle due in part to the fact that the rear ports of the microphone assembly open towards this airflow. A plot of the sensitivity of the first prototype to such noise over a frequency band of 20 Hz to 1000 Hz is shown as plot A in FIG. 13.

Figure 14:
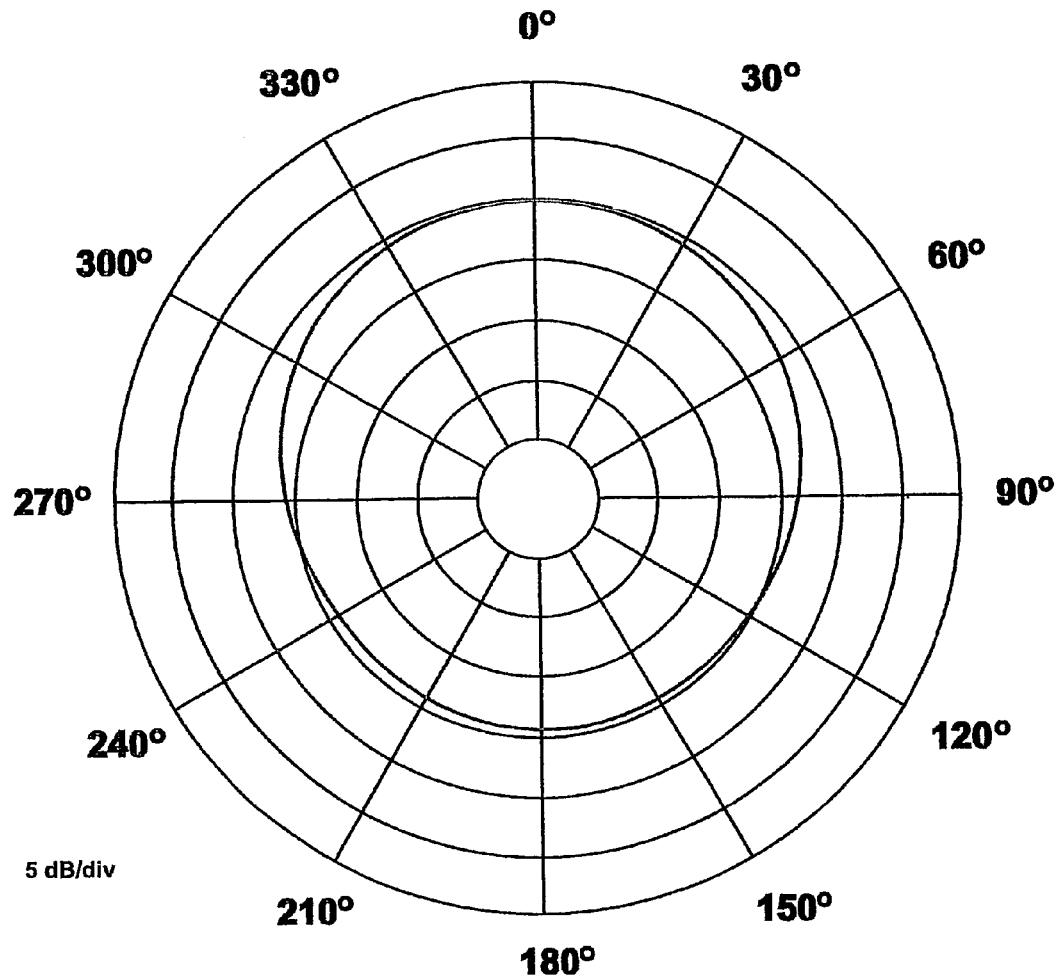
FIG. 14 is a polar plot taken of a rearview mirror assembly of the present invention having a microphone assembly with a very high acoustic resistance windscreen, but with no acoustic dam.

To reduce the sensitivity of the microphone assembly to the defroster airflow, a windscreen having a very high acoustic resistivity was used in the second prototype. As shown in plot B of FIG. 13, the use of the very high acoustic resistivity windscreen significantly reduced the sensitivity of the microphone to the defroster airflow noise. However, very high acoustic resistivity windscreen adversely made the microphone sensitivity much less directional as shown in the polar plot of FIG. 14.

Figure 15:
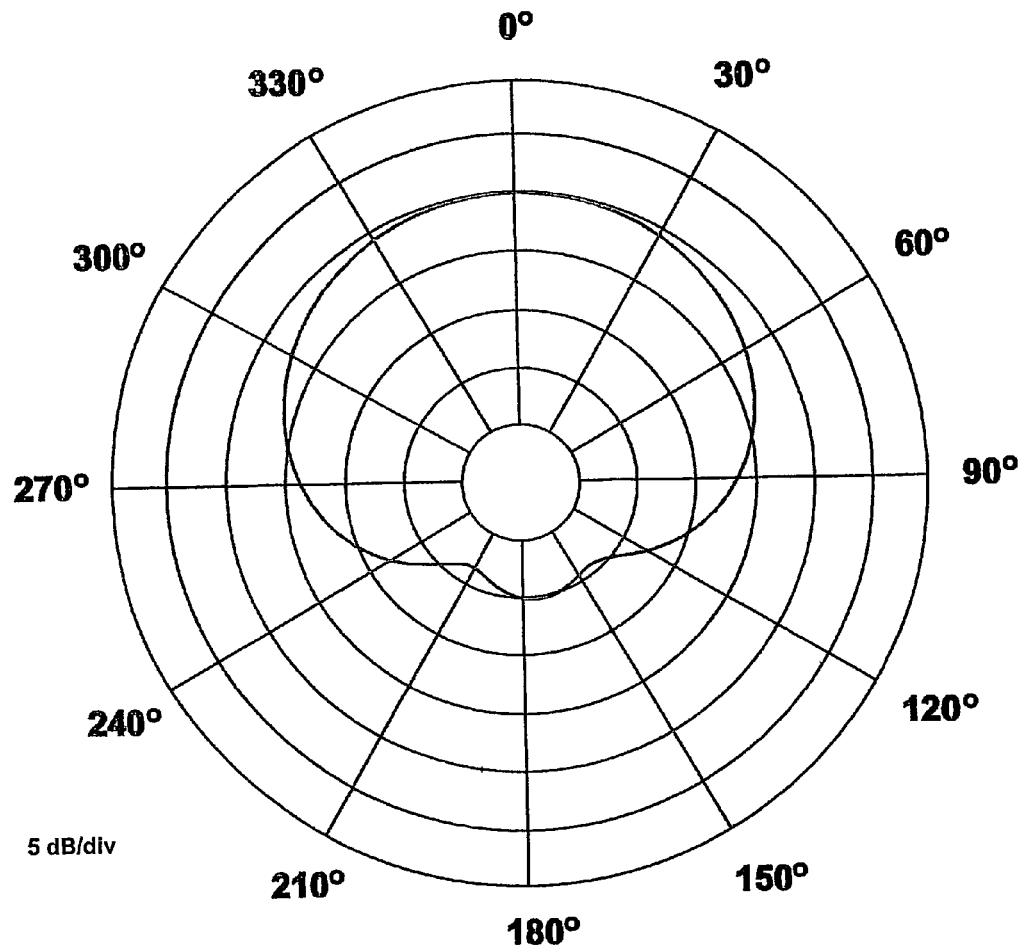
FIG. 15 is a polar plot taken of a rearview mirror assembly of the present invention having a microphone assembly with a very high acoustic resistance windscreen and an acoustic dam.

A third prototype was then constructed and tested whereby acoustic dam 230 was added to the prototype having the very high acoustic resistivity windscreen. Surprisingly, as shown in the polar plot of FIG. 15, the directional sensitivity of the microphone assembly was recovered despite the use of the very high acoustic resistivity windscreen. Therefore, the benefit of noise rejection provided by the windscreen may be exploited without any loss in directionality.

There are several useful variations on the basic dam. These include forming more than two zones supporting more than one transducer in a single outer housing. Since these zones are acoustically as separate as the outer ports, a single housing can hold multiple transducers to gain the advantage of a large nitration volume and yet have each transducer act as if it were in its own separate housing as far as acoustic directional properties are concerned. It will be appreciated that acoustic dam 230 could be integral extension of circuit board or microphone housing rather than a separate element.

The acoustic dam design frees the designer from the tradeoffs of the prior art. Large housings can be used yet act as several smaller ones. Transducers can be aimed internally different from the aiming direction of the external microphone without using ducts that impair higher frequency performance.

One aspect derived from this design is the ability to create highly directional microphones with directional attributes that do not vary with frequency to the degree prior art microphones do. In a typical microphone design, in order to increase the directional aspect from omni-directional through all possibilities to bi-directional, the transducer's internal damping must be lowered. The assignees prior "D" extender designs modestly improved this relationship by adding additional directional pressures. The new acoustic dam allows very directional microphones with very high damping factors. In other words, the acoustic resistance is so high that it swamps out the other variables that cause directional parameters to change with frequency.

Figure 16:
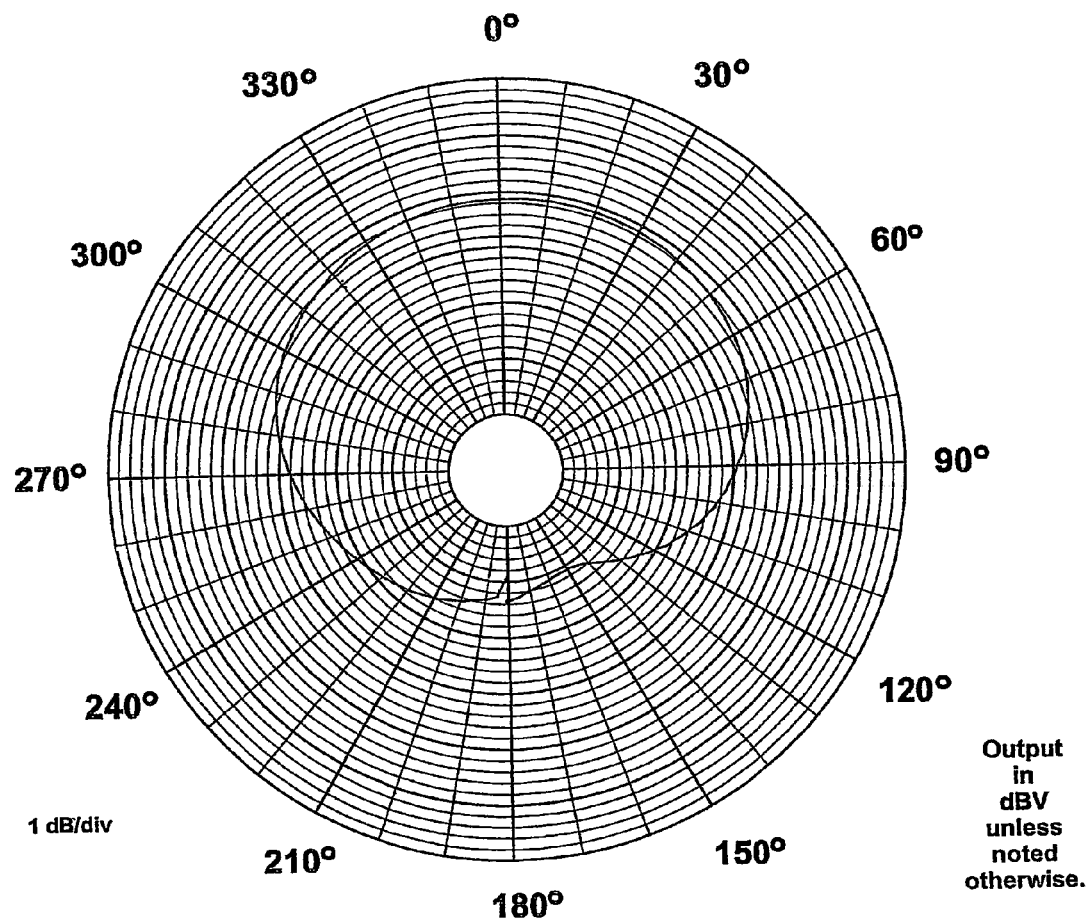
FIG. 16 is a polar plot taken of a rearview mirror assembly of the present invention in a first orientation at 250 Hz and having a microphone assembly with a very high acoustic resistance windscreen and an acoustic dam.
Figure 17:
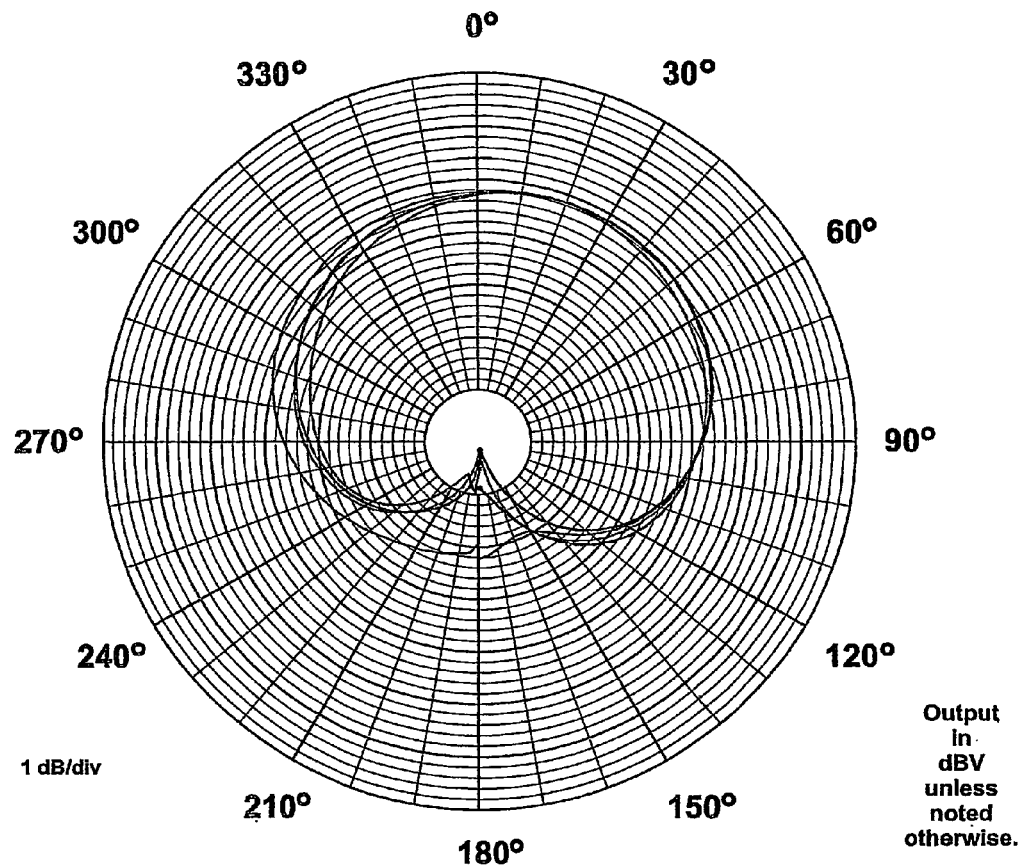
FIG. 17 shows various polar plots taken of a rearview mirror assembly of the present invention in a first orientation at various frequencies between 300 Hz and 2 kHz and having a microphone assembly with a very high acoustic resistance windscreen and an acoustic dam.
Figure 18:
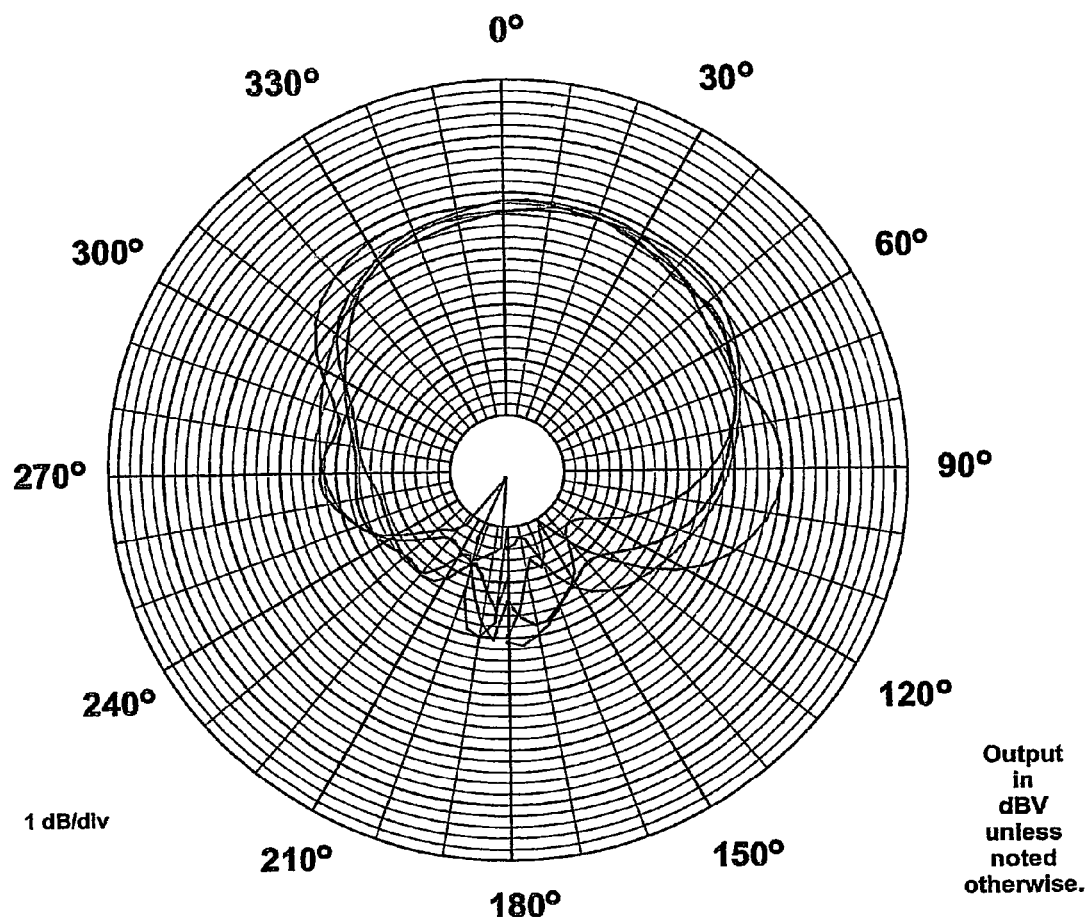
FIG. 18 shows various polar plots taken of a rearview mirror assembly of the present invention in a first orientation at various frequencies between 3 Hz and 6 kHz and having a microphone assembly with a very high acoustic resistance windscreen and an acoustic dam.

To demonstrate the ability of the inventive structure to maintain directional parameters over frequency bands of interest, the third prototype rearview mirror described above (i.e., having the very high acoustic resistance windscreen and the acoustic dam) was placed in a test chamber with the mirror glass face up and in a horizontal plane. The mirror assembly as rotated about a vertical axis extending perpendicularly through the middle of the mirror glass and polar plots were obtained at various frequencies for the driver-side microphone assembly. These polar plots are shown in FIGS. 16-18 in which the 0 degree axis corresponds to the top of the mirror assembly and the 180 degree axis corresponds to the bottom of the mirror assembly. FIG. 16 shows a polar plot at 250 Hz, whereas FIG. 17 shows various plots between 300 Hz and 2 kHz and FIG. 18 shows various plots taken between 3 kHz and 6 kHz. In viewing these plots it will be noted that the plots do not vary significantly from frequency to frequency and that the greatest sensitivity is at about 30 degrees. This ideal insofar as the mirror assembly is typically rotated and tilted relative to the driver so as to have maximum sensitivity to receive sound waves from the driver that reflect off of the windshield and/or headliner of the vehicle.

Figure 19:
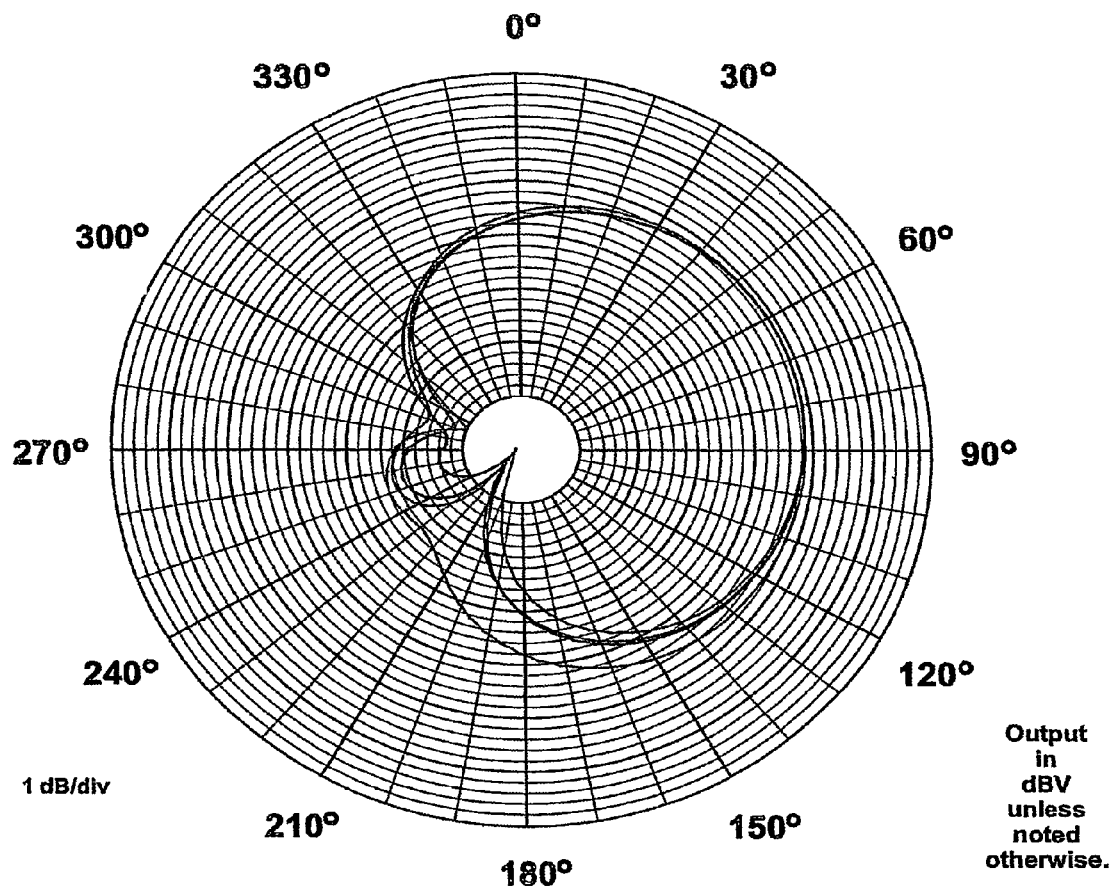
FIG. 19 shows various polar plots taken of a rearview mirror assembly of the present invention in a second orientation at various frequencies between 300 Hz and 1 kHz and having a microphone assembly with a very high acoustic resistance windscreen and an acoustic dam.
Figure 20:
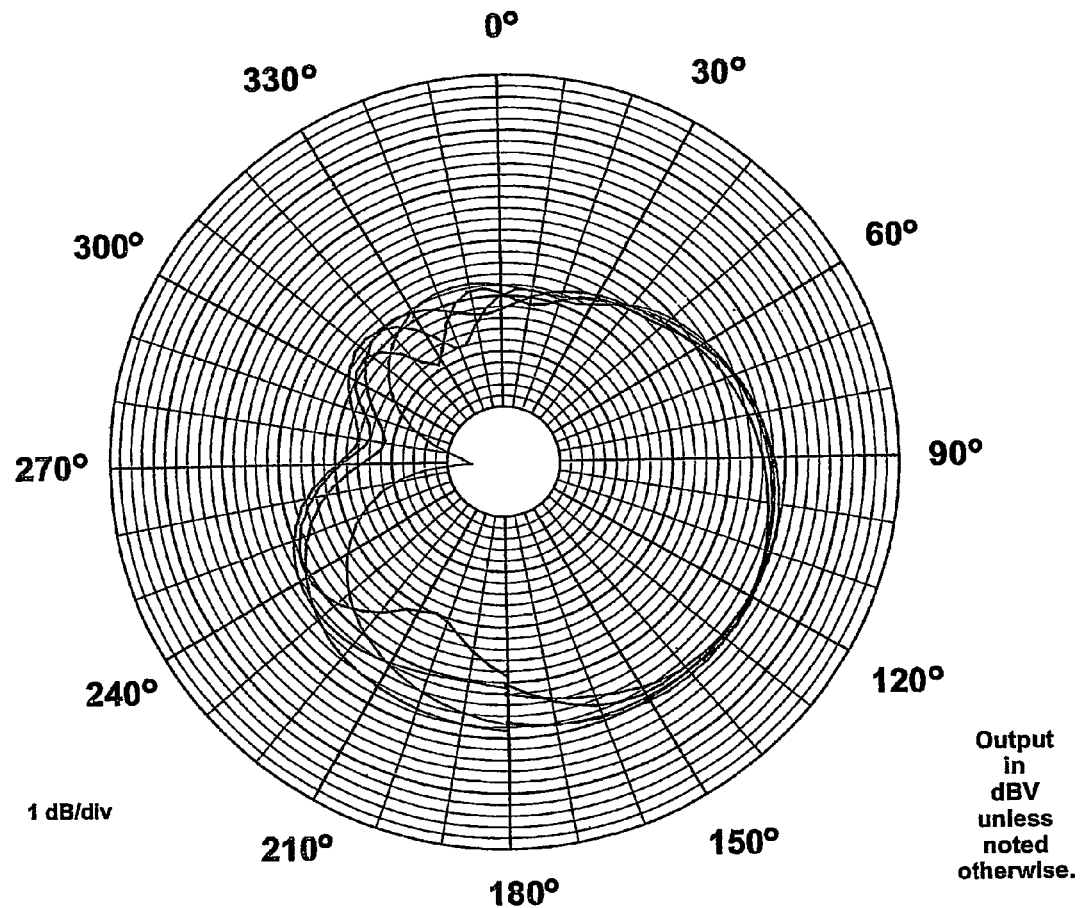
FIG. 20 shows various polar plots taken of a rearview mirror assembly of the present invention in a second orientation at various frequencies between 3 kHz and 6 kHz and having a microphone assembly with a very high acoustic resistance windscreen and an acoustic dam.
Figure 21:
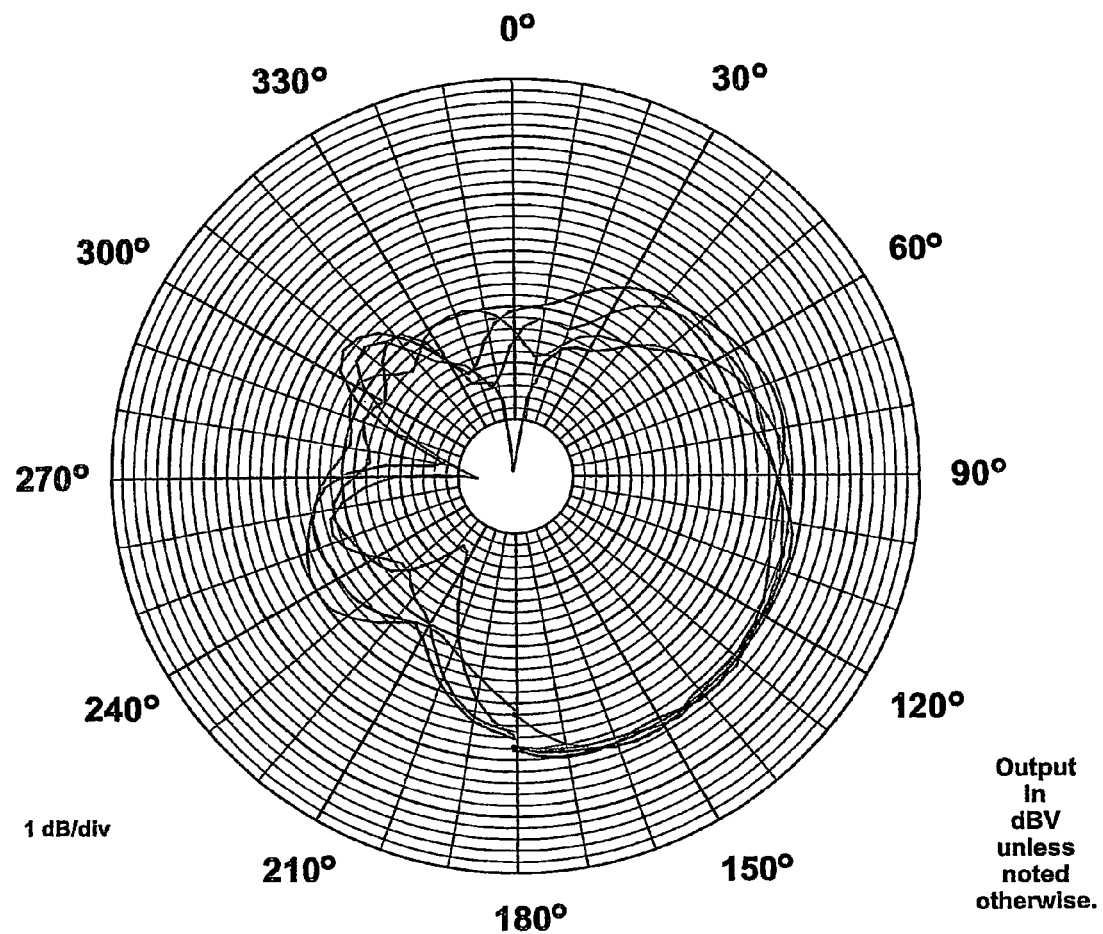
FIG. 21 shows various polar plots taken of a rearview mirror assembly of the present invention in a second orientation at various frequencies between 6.5 Hz and 8 kHz and having a microphone assembly with a very high acoustic resistance windscreen and an acoustic dam.

To test the directionality in a different plane, the same mirror assembly was placed in the test chamber on end such that the axis about which the mirror assembly is rotated being parallel to the axis of the mirror extended along its longest dimension. In these resulting polar plots, the zero degree axis corresponds to an axis that is perpendicular to, and extends in front of, the mirror glass. FIG. 19 shows various polar plots between 300 Hz and 1 kHz, whereas FIG. 20 shows various plots between 3 kHz and 6 kHz and FIG. 18 shows various plots taken between 6.5 kHz and 8 kHz. In these plots, it will again be noted that there is little various in directional sensitivity as a function of frequency. Also, the maximum sensitivity for frequencies between 3 kHz and 8 kHz occurs at about 120 degrees, which would be ideally corresponding to an upwards direction when the mirror assembly is tilted downward by the driver in a normal viewing position.

Finally, by allowing port areas to set aiming direction and effective "D", the dam design supports the use of any housing styling (even non-symmetrical designs) since port area can be symmetrical and the acoustic dam can form regions of the correct volume. In this case, the advantage takes the form of freedom of physical design, and thus housings that are larger and have more complex exterior shapes can be used.

Figure 22:
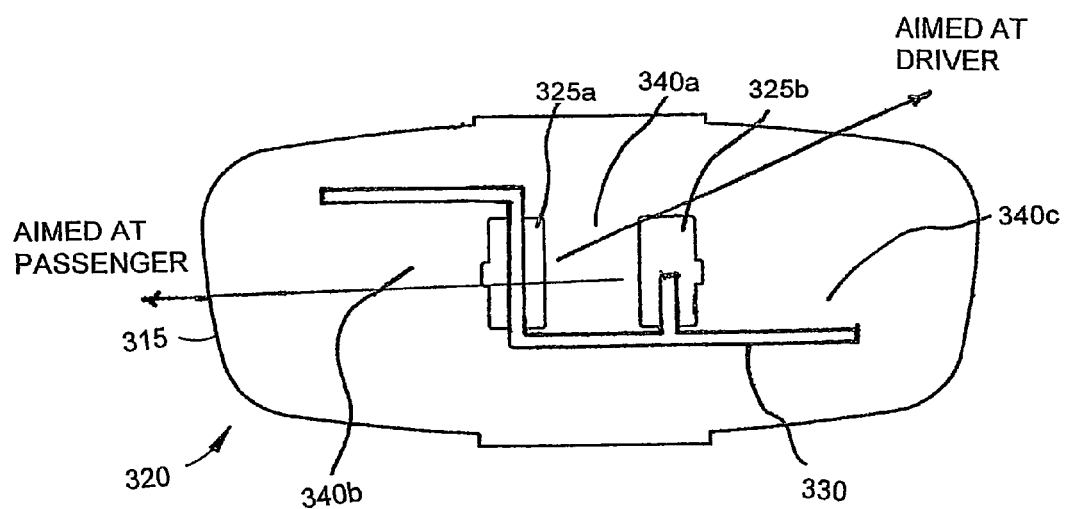
FIG. 22 is a schematic view of a microphone assembly of the present invention.
Figure 23:
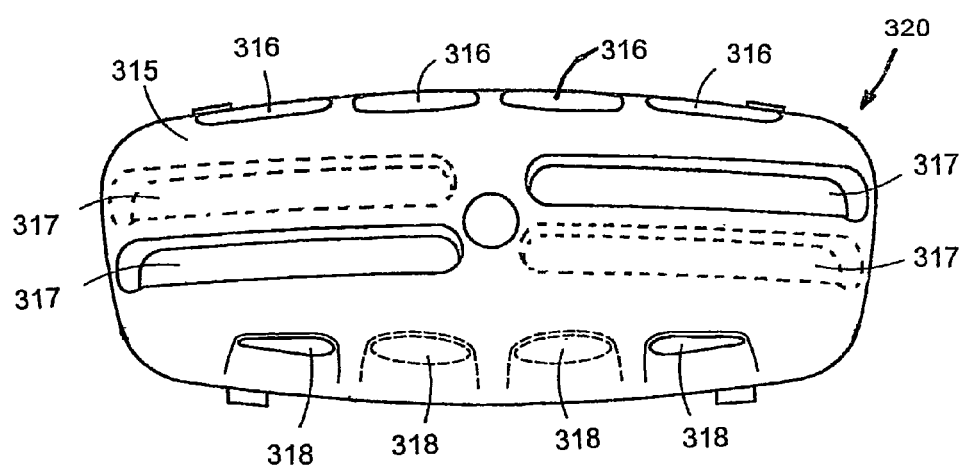
FIG. 23 is a perspective view of the microphone assembly shown in FIG. 22.

As suggested above, the above described acoustic dam (or at least a modified version thereof) may be implemented in a microphone assembly having a microphone housing in which two or more transducers are mounted. An example of such a microphone assembly 320 is shown in FIGS. 22 and 23. This particular embodiment of the inventive microphone assembly is intended for mounting to the top surface of the mirror housing in a manner similar to that disclosed in commonly-assigned U.S. Patent Application Publication No. 2002-0110256-A1. It will be appreciated, however, that the depicted microphone assembly 320 could be mounted elsewhere.

Microphone housing 315 preferably includes front ports 316 and rear ports 318, and may include top ports 317. In the example shown in FIGS. 22 and 23, the two centermost rear ports 318 are closed as are two of top ports 317 (the closed ports are shown in dashed lines). As shown in FIG. 22, three zones 340*a*, 340*b*, and 340*c* are formed within microphone housing 315 by an acoustic dam 330. First zone 340*a* is common to the fronts of the transducers 325*a* and 325*b*. Second zone 340*b* is formed to the rear of transducer 325*a* and third zone 340*c* is formed to the rear of transducer 325*b*. These zones steer the aiming direction of the first transducer 325*a* to better aim at the driver yet keep the transducers physically facing in opposite directions to gain the advantages in air flow and vibration cancellation. Thus, more than one transducer may be provided in a housing and more than two zones may be formed to thereby provide the freedom to aim the sensitivity of the microphone assembly based on the outer port locations rather than physical orientation of the transducers.

The acoustic dam 330 forces a definition of the ports 316, 317, and 318 that will contribute to the front and those that will add up to be the rear signal. There will be a center of area that will act as the virtual location for the front and another for the rear. A line through these two centers will form the aiming axis independent of the transducer orientation. In this third depicted embodiment, the rear zones are formed such that the driver-facing microphone transducer 325*a* will aim more into the cab and the rear of the passenger-facing transducer 325*b* aims more away from the cab. This is accomplished by changing to which side of the acoustic dam 330 the rear ports 318 connect. In this third embodiment, acoustic dam 330 extends from the top of the circuit board to the top inner surface of the microphone housing 315 and extends tightly around all of the upper peripheral edge of transducer 325*a* and tightly around half of the upper peripheral edge of transducer 325*b*. This provides for a tight acoustic seal through the acoustic chamber defined by housing 315 with the exception of the openings at one side of transducer 325*b* and at the ends of dam 330.

The inventive microphone construction is preferably located on the back of a rearview mirror assembly housing. Nevertheless, the certain aspects of the inventive microphone may be implemented in microphones mounted at other locations on a mirror assembly, including on the mirror assembly mounting structure, the top, bottom, or sides of the mirror housing, as well as in any other vehicle accessory such as a headliner, sun visor, overhead console, A-pillar, or a console extending between the headliner and a mirror assembly. For example, the above-described acoustic dam may be employed in various microphone assemblies whether used in vehicle applications or any other non-vehicle applications. Additionally, the mounting of two microphone assemblies in a vehicle such that the microphones are spaced apart with an acoustic barrier therebetween like the portion of the rear surface of the mirror housing. For example, if an overhead console is provided, the microphone assemblies could be recessed into the console and spaced apart in a manner similar to the disclosed mirror assembly implementation. Further, if the overhead console protrudes downward from the headliner, the microphone assemblies could be mounted on either side of the console with or without recesses.

The above description is considered that of the preferred embodiments only. Modifications of the invention will occur to those skilled in the art and to those who male or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An interior rearview mirror assembly for a vehicle comprising:
   a mirror housing adapted for attachment to the interior of the vehicle, said mirror housing having a top surface, a bottom surface, a back surface extending between said top and bottom surfaces and generally facing the front of the vehicle, and an opening generally facing the rear of the vehicle;
   a mirror disposed in said opening of said mirror housing;
   a first microphone transducer carried by said mirror housing along said back surface;
   a first microphone housing mounted on said back surface such that said first microphone transducer is mounted within said first microphone housing; and
   wherein said first microphone housing includes at least one first port covered by a windscreen having an acoustic resistivity of at least 1 acoustic $\Omega/cm^2$ that is acoustically coupled to a front surface of said first microphone transducer.

2. The interior rearview mirror assembly of claim 1 and further comprising a second microphone transducer carried by said mirror housing along said back surface at a position laterally spaced apart from said first microphone transducer.

3. The interior rearview mirror assembly of claim 1 and further comprising a first microphone housing mounted on said back surface, wherein said first microphone transducer is mounted within said first microphone housing.

4. The interior rearview mirror assembly of claim 3, wherein said first microphone housing is mounted in a recess formed in said back surface.

5. The interior rearview mirror assembly of claim 4, wherein said recess includes a wall below said first microphone housing such that said back surface deflects airflow coming from the below said rearview mirror assembly and along the windshield of the vehicle away from said first microphone housing.

6. The interior rearview mirror assembly of claim 3, wherein said first microphone housing is mounted on said back surface such that said at least one first port opens generally towards the top of said mirror housing.

7. The interior rearview mirror assembly of claim 3, wherein said windscreen is sealed across said at least one first port, said windscreen having hydrophobic properties to prevent water from penetrating said microphone housing through said at least one first port.

8. The interior rearview mirror assembly of claim 1 and further including a circuit board having a hole sized to receive at least a portion of said first microphone transducer, wherein said first microphone transducer is mounted within the hole in the circuit board such that a portion of said transducer extends below a bottom surface of said circuit board.

9. The interior rearview mirror assembly of claim 8, wherein said circuit board is mounted relative to said rearview mirror assembly such that said circuit board is substantially parallel to a surface of said mirror.

10. The interior rearview mirror assembly of claim 9 and further comprising a mother board mounted in said mirror housing substantially in parallel with said circuit board.

11. The interior rearview mirror assembly of claim 1 further comprising:
    a microphone housing defining an acoustic chamber, said microphone housing being mounted to the back surface of said mirror housing, wherein said transducer is contained in the acoustic chamber; and
    an acoustic dam extending through said housing and dividing said acoustic chamber into at least two zones including a first zone and a second zone, wherein said transducer includes a front face exposed to said first zone of said acoustic chamber and a rear face exposed to said second zone of said acoustic chamber.

12. An interior rearview mirror assembly for a vehicle comprising:
    a mirror housing adapted for attachment to the interior of the vehicle, said mirror housing having a top surface, a bottom surface, a back surface extending between said top and bottom surfaces and generally facing the front of the vehicle, and an opening generally facing the rear of the vehicle;
    a mirror disposed in said opening of said mirror housing;
    a first microphone transducer carried by said mirror housing along said back surface;
    a second microphone transducer carried by said mirror housing along said back surface at a position laterally spaced apart from said first microphone transducer;
    a first microphone housing and a second microphone housing each mounted on said back surface such that said first microphone transducer is mounted within said first microphone housing and the second microphone transducer is mounted within said second microphone housing; and
    wherein said first microphone housing and said second microphone housing includes at least one first port covered by a windscreen having an acoustic resistivity of at least 1 acoustic $\Omega/cm^2$ that is acoustically coupled to a front surface of both said first microphone transducer and second microphone transducer.

13. The interior rearview mirror assembly of claim 12, wherein said first and second microphone housings are each mounted in a recess formed in said back surface.

14. The interior rearview mirror assembly of claim 13, wherein each said recess includes a wall below a respective one of said first and second microphone housings such that said back surface deflects airflow coming from the below said rearview mirror assembly and along the windshield of the vehicle away from said first and second microphone housings.

15. The interior rearview mirror assembly of claim 12, wherein said first and second microphone housings are mounted on said back surface such that each said at least one first port opens generally towards the top of said mirror housing.

16. The interior rearview mirror assembly of claim 12, wherein said windscreen is sealed across said at least one first port, said windscreen having hydrophobic properties to prevent water from penetrating said microphone housing through said at least one first port.

17. The interior rearview mirror assembly of claim 12 and further including a first circuit board and a second circuit board each having a hole sized to receive at least a portion of a corresponding one of said first and second microphone transducers, wherein a corresponding one of said first and second microphone transducers is mounted within each hole in the circuit boards such that a portion of the transducers extends below a bottom surface of the circuit board.

18. The interior rearview mirror assembly of claim 17, wherein each said circuit board is mounted relative to said rearview mirror assembly such that said circuit board is substantially parallel to a surface of said mirror.

* * * * *

UNITED STATES PATENT AND TRADEMARK OFFICE
CERTIFICATE OF CORRECTION

PATENT NO.        : 7,447,320 B2
APPLICATION NO.   : 10/492490
DATED             : November 4, 2008
INVENTOR(S)       : Bryson et al.

It is certified that error appears in the above-identified patent and that said Letters Patent is hereby corrected as shown below:

Col. 1, line 8,
  "19(e)" should be --119(e)--;

Col. 3, line 7,
  "having" should be --includes--;

Col. 3, line 16,
  "having" should be --includes--;

Col. 4, line 37,
  delete "taken along line IX-IX";

Col. 6, line 1,
  "assembles" should be --assemblies--;

Col. 6, line 29,
  "noise. The" should be --noise, the--;

Col. 7, line 22,
  "FIG." should be --FIGS.--;

Col. 7, lines 58-61,
  "Incorrect arrival time difference will narrow the possibly conflicting noises to those arriving source locations around the line connecting the two transducer's center lines." should be --An incorrect arrival time difference will narrow the possibility of conflicting noises to those arriving source locations positioned around the line connecting the two transducers' center lines.--;

Col. 8, line 41,
  "cost. The" should be --cost, the--;

Col. 8, line 49,
  "respect to a normal to the mirror" should be --respect to the mirror--;

UNITED STATES PATENT AND TRADEMARK OFFICE
CERTIFICATE OF CORRECTION

| | |
|---|---|
| PATENT NO. | : 7,447,320 B2 |
| APPLICATION NO. | : 10/492490 |
| DATED | : November 4, 2008 |
| INVENTOR(S) | : Bryson et al. |

It is certified that error appears in the above-identified patent and that said Letters Patent is hereby corrected as shown below:

Col. 9, line 13,
"that downward" should be --that face downward--;

Col. 9, line 55,
after "that" delete --the--;

Col. 10, line 4,
"an pre-processing" should be --a pre-processing--;

Col. 10, line 5,
"are" should be --is--;

Col. 10, line 55,
after "surfaces" insert --of--;

Col. 10, line 64,
after "of" insert --the--;

Col. 10, line 66,
"improved" should be --improve--;

Col. 10, line 67,
"resistively" should be --resistivity--;

Col. 11, line 16,
"assemblies" should be --assemblies'--;

Col. 11, line 50,
"it is" should be --they are--;

Col. 12, line 5,
after "housing" insert --and--;

UNITED STATES PATENT AND TRADEMARK OFFICE
CERTIFICATE OF CORRECTION

| | |
|---|---|
| PATENT NO. | : 7,447,320 B2 |
| APPLICATION NO. | : 10/492490 |
| DATED | : November 4, 2008 |
| INVENTOR(S) | : Bryson et al. |

It is certified that error appears in the above-identified patent and that said Letters Patent is hereby corrected as shown below:

Col. 12, line 34,
"housings" should be --housing--;

Col. 13, line 17,
"assembly" should be --assemblies--;

Col. 13, line 18,
after "end" insert --of--;

Col. 13, line 34 (second occurrence),
"the" should be --than--;

Col. 13, line 35,
"trough" should be --through--;

Col. 14, line 49,
after "zone" insert --;--;

Col. 14, line 53,
"phenomena" should be --phenomenon--;

Col. 15, line 10,
after "242," delete --a--;

Col. 15, line 52,
"could be integral extension of circuit" should be --could be an integral extension of the circuit--;

Col. 16, line 23,
after "This" insert --is--;

UNITED STATES PATENT AND TRADEMARK OFFICE
CERTIFICATE OF CORRECTION

PATENT NO. : 7,447,320 B2
APPLICATION NO. : 10/492490
DATED : November 4, 2008
INVENTOR(S) : Bryson et al.

It is certified that error appears in the above-identified patent and that said Letters Patent is hereby corrected as shown below:

Col. 16, line 38,
"various" should be --variation--;

Col. 17, line 47,
"a vehicle such that" should be --a vehicle may be configured such that--;

Col. 17, line 58,
"male" should be --make--;

Col. 18, claim 5, line 33,
after "from" delete --the--.

Signed and Sealed this

Third Day of March, 2009

JOHN DOLL
*Acting Director of the United States Patent and Trademark Office*